(12) United States Patent
Nakdimon et al.

(10) Patent No.: US 10,558,943 B2
(45) Date of Patent: Feb. 11, 2020

(54) SYSTEM AND METHOD FOR MONITORING STOCKING SHELVES

(71) Applicant: WISHELF Ltd., Caesarea Industrial Zone North (IL)

(72) Inventors: Shalom Nakdimon, Tel Aviv (IL); Yaeer Master, Tel Aviv (IL)

(73) Assignee: WISHELF LTD., Caesarea Industrial Zone North (IL)

( * ) Notice: Subject to any disclaimer, the term of this patent is extended or adjusted under 35 U.S.C. 154(b) by 0 days.

(21) Appl. No.: 16/093,652

(22) PCT Filed: Apr. 20, 2017

(86) PCT No.: PCT/IL2017/050465
§ 371 (c)(1),
(2) Date: Oct. 15, 2018

(87) PCT Pub. No.: WO2017/183038
PCT Pub. Date: Oct. 26, 2017

(65) Prior Publication Data
US 2019/0073627 A1  Mar. 7, 2019

Related U.S. Application Data

(60) Provisional application No. 62/324,965, filed on Apr. 20, 2016.

(51) Int. Cl.
*G06F 19/00* (2018.01)
*G06Q 10/08* (2012.01)
(Continued)

(52) U.S. Cl.
CPC ....... *G06Q 10/087* (2013.01); *G06K 7/10425* (2013.01); *G06N 3/084* (2013.01)

(58) Field of Classification Search
CPC ... G06K 7/10425; G06N 3/084; G06Q 10/087
See application file for complete search history.

(56) References Cited

U.S. PATENT DOCUMENTS 5,671,362 A 9/1997 Cowe et al.
6,349,244 B1 * 2/2002 Bardin ................ G06Q 10/087
221/108
(Continued)

FOREIGN PATENT DOCUMENTS

WO 2007/149967 12/2007
WO 2010/077771 7/2010

*Primary Examiner* — Thien M Le

(57) ABSTRACT

A system and method for monitoring stocked shelves is disclosed. A shelf monitor comprising an array of sensors id deployed in proximity to a stocking shelf and so that the sensors face a region on the stocking shelf containing shelved goods. A CPU module is configured to receive outputs from the sensors and execute a detection algorithm to detect a change event in the shelved goods and an algorithm to train the detection algorithm. Shelf monitors can be used in multiple numbers; a master shelf among the shelf monitors serves to aggregate data and local control of the system. A master controller can establish communication with a cloud server, allowing many additional features such as integrating the shelf monitoring system with inventory and point-of-sale databased.

34 Claims, 26 Drawing Sheets

(51) Int. Cl.
*G06K 7/10* (2006.01)
*G06N 3/08* (2006.01)

(56) References Cited

U.S. PATENT DOCUMENTS

| | | | | |
|---|---|---|---|---|
| 6,816,074 | B2* | 11/2004 | Wong | G06Q 10/087 |
| | | | | 232/27 |
| 7,233,241 | B2* | 6/2007 | Overhultz | A47F 10/02 |
| | | | | 211/59.2 |
| 7,792,711 | B2* | 9/2010 | Swafford, Jr. | A47F 1/126 |
| | | | | 705/22 |
| 2003/0052778 | A1* | 3/2003 | Wong | G06Q 10/087 |
| | | | | 340/540 |
| 2009/0053017 | A1* | 2/2009 | Shmuelov | H01L 21/67017 |
| | | | | 414/217 |
| 2012/0143357 | A1 | 6/2012 | Chemel et al. | |
| 2015/0041537 | A1 | 2/2015 | Gentile et al. | |
| 2015/0041616 | A1 | 2/2015 | Gentile et al. | |
| 2018/0165626 | A1* | 6/2018 | Davidson | G01F 23/36 |
| 2018/0189720 | A1* | 7/2018 | Henderson | G06Q 10/087 |

\* cited by examiner

| 531 | 420 | 124 | 87 |
| --- | --- | --- | --- |
| 146 | 146 | 54 | 146 |
| 67 | 456 | 2 | 10 |
| 78 | 178 | 54 | 78 |
| 654 | 432 | 178 | 12 |

Figure 24

SYSTEM AND METHOD FOR MONITORING STOCKING SHELVES

FIELD OF THE INVENTION

The invention relates to inventory management technology, and in particular to a system for detecting changes in physical inventory.

BACKGROUND TO THE INVENTION

For the last past 15 years there have been different attempts made to monitor inventory. Wireless RFID tags have been deployed in different ways with different antennas and different detectors. Pressure detectors, weight detectors, and video analysis have also been deployed for monitoring inventory.

SUMMARY OF THE INVENTION

However, developing of a solution dealing with an array of light sensors directly facing the stock, and especially working only with lighting from ordinary illumination have never been used. The difficulties and instability light detection have led developers to choose different solutions to identify inventory status.

Also a design of a of a master-slave system including a cloud solution for inventory management was not a part of the invention history.

BRIEF DESCRIPTION OF THE FIGURES

FIG. 24 shows a sample sensor array reading, for the purpose of explaining detection and training algorithms in the shelf logic unit.

Figure 1:
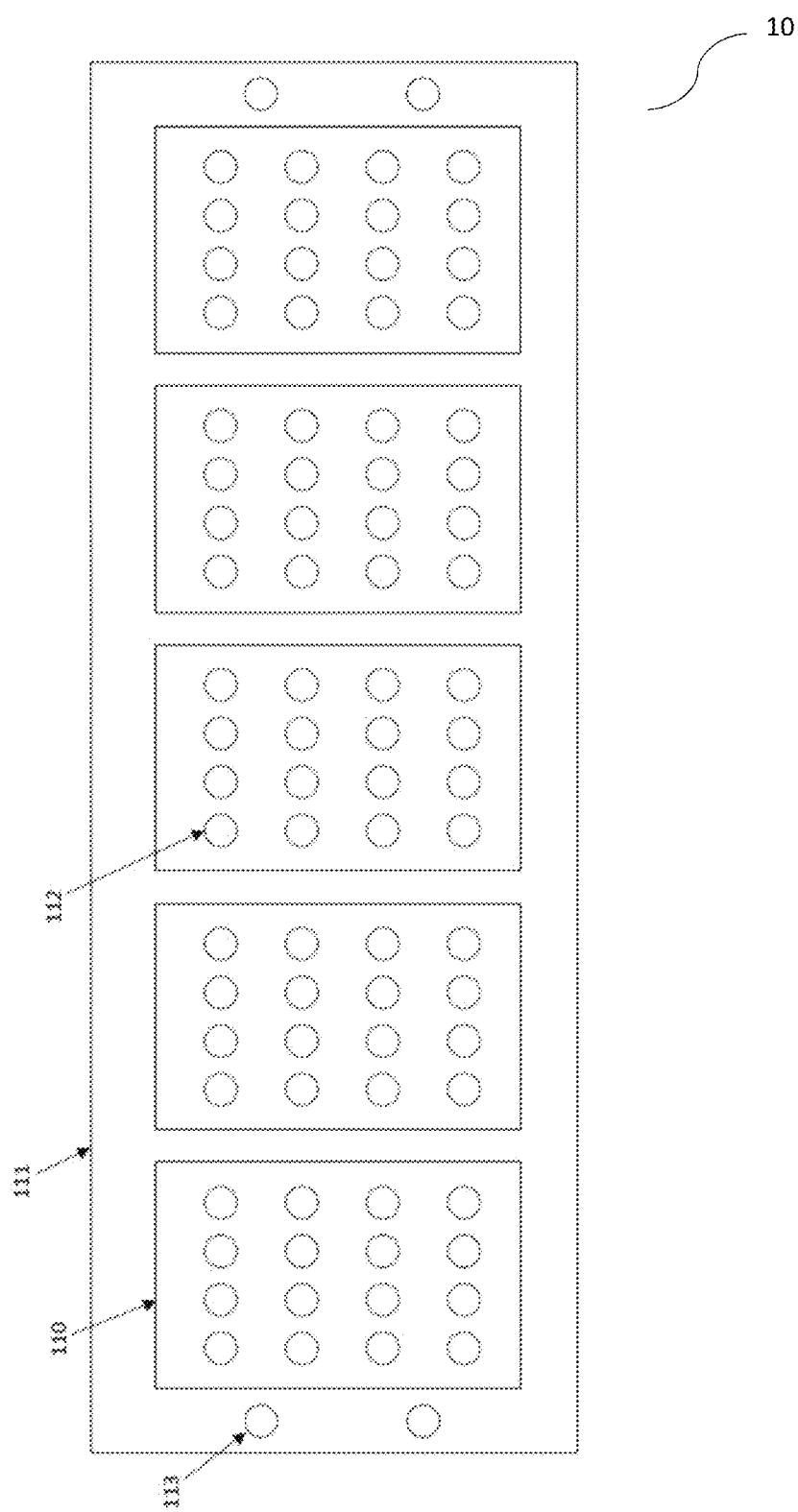
FIG. 1 shows a stock monitoring system comprising a shelf monitor installed with a stocking shelf, according to some embodiments of the invention.

It is understood that specific implementations of a functional unit and that model numbers depicted in the drawings are only representative examples and do not limit the invention to any of those implementations and model numbers.

DETAILED DESCRIPTION

The following system presented herein is a light sensing and communication system for storage such as shelf or a shelf construction or any type of surface with the need to monitor goods placed on it. The system could locate the location of the goods on the storage and identify absence of a product. The system is unique because it manages an uncontrolled warehouse, while in most warehouses a pickup order is generated and an authorized person collect the goods in a predefined known (to the ERP software) list. In an aspect of the invention is provided system that manages a storage facility where authorized pickers, non-authorized pickers such as the customers of a store who pickup products from unknown list. The system may also help deal with shoplifters and shoppers who return an item to the wrong place, leading to missing goods. The system could communicate with a cloud server, mobile device, computer, wearable device or other device with communication port.

Figure 2:
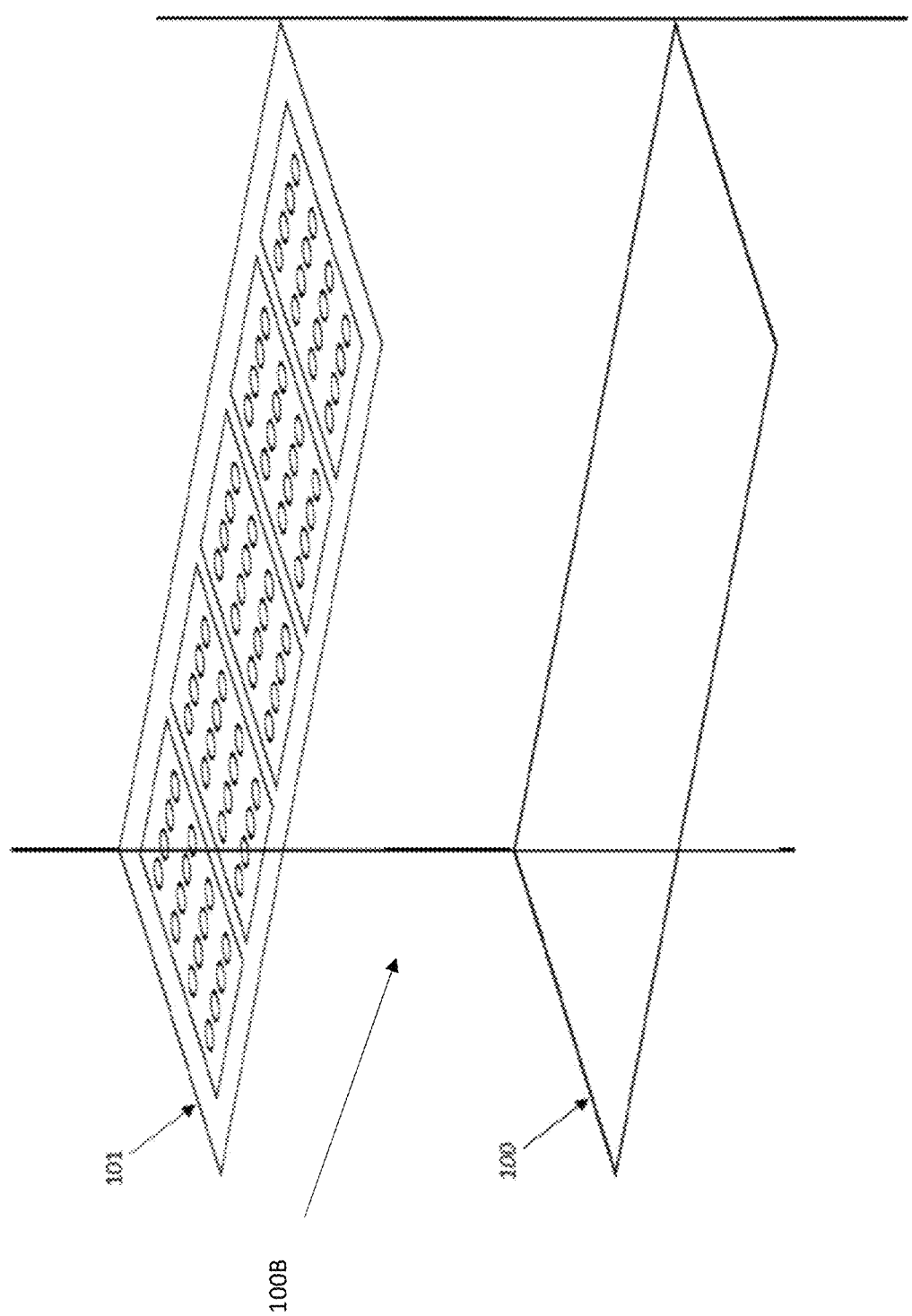
FIG. 2 shows a shelf monitor of a stock monitoring system, installed with a stocking shelf that is stocked with shelved stock 100C, according to some embodiments of the invention.
Figure 3:
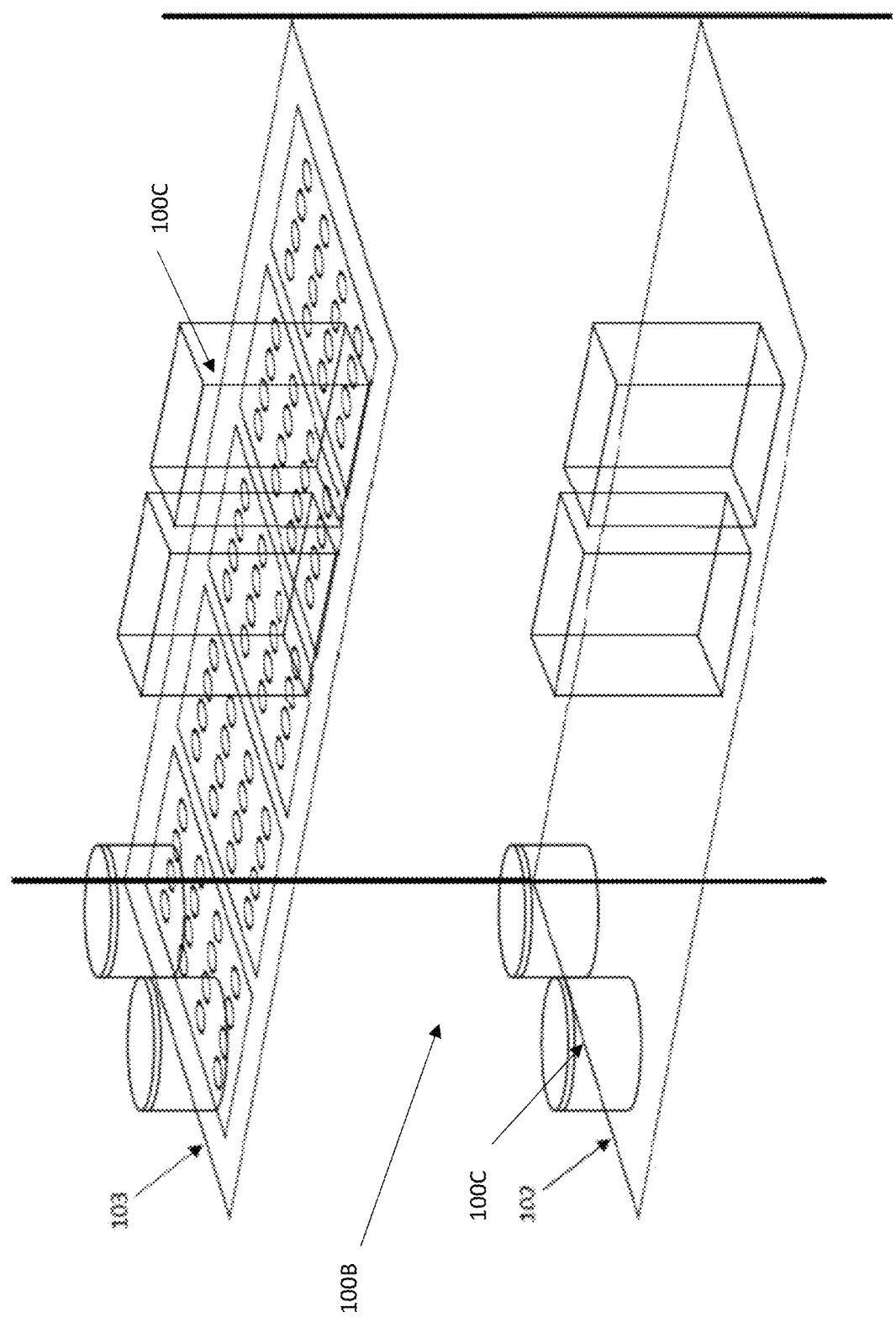
FIG. 3 shows a shelf monitor of a stock monitoring system, facing an array of sensors of the shelf monitor, according to some embodiments of the invention.

Reference is now made to FIGS. 1-3. In an exemplary embodiment, a stock monitoring system 10 comprises a shelf monitor 111, substantially plate-shaped. An array of sensors 112 is disposed along one or both surfaces of shelf monitor 111. Shelf monitor 111 may be built of several smaller plates 110.

In FIG. 2, shelf monitor 101 is shown mounted in proximity to a stocking shelf 100. Shelf monitor 101 could be located under, over or inside a stocking shelf 100. Shelf monitor 101 can be mounted on, behind, or inside the shelf support construction. The shelf monitor could be flat, domed, concave, diagonal, or any other specific shape to be substantially parallel with the goods on the stocking shelf 100. Shelf monitor 101 can include mounting holes 113 for fastening to a stocking shelf 100.

Sensors 112 of shelf monitor 101 are oriented facing one or more stocking regions 100B of stocking shelf 100; in FIG. 3, shelved stock 100C is shown occupying stocking regions 100B. Shelved stock 100C can comprise stock items of different sizes and shapes. Sensors 112 observe shelved stock 100C for the purpose of detecting a status change event—such as placement or removal of a stock item—of shelved stock 100C.

The array of sensors 112 may contain one or several kinds of sensors. Sensors 112 may be organized in a square matrix, a hexagonal matrix, or any other suitable pattern. Sensors 112 may be of one kind or a mix of different kinds of sensors. Kinds of usable sensors include visible or infrared photodetectors, pressure sensors, RF sensors, acoustic sensors, x-ray detectors, or any other sensors suitable to the product type, quantity, location, or absence in a specific location or radius. In a preferred embodiment, sensors 112 are inexpensive CdS photoconductive cells such as Advanced Photonix model PDV-P8103.

Figure 4:
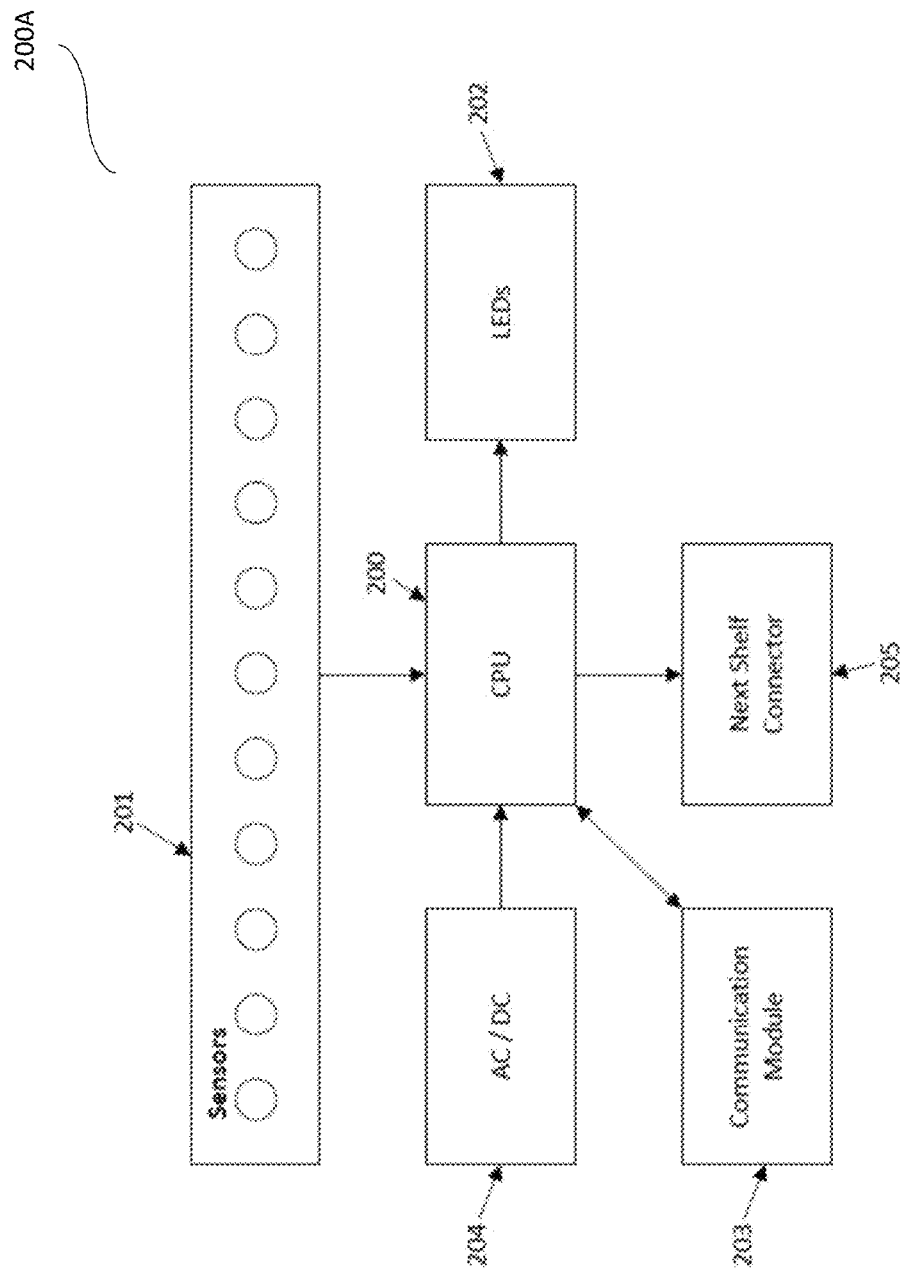
FIG. 4 shows a functional block diagram of a shelf monitor and an electronics unit of a stock monitoring system, according to some embodiments of the invention.

Reference is now made to FIG. 4. In an exemplary embodiment, a shelf monitor 111 is accompanied by an electronics unit 200A comprising sensors 201, a CPU module 200, a power module 204, and a communication module. Modules of the electronics unit 200A may be integrated in shelf monitor 101, 111 or external to shelf monitor 101, 111. CPU module 200 is configured to receive outputs of sensors 201 and execute algorithms for detection of status change events of shelved stock 100C and for training the detection algorithm, described herein. Power module 204 provides low voltage DC power to other components of the electronics unit 200A. Power module 204 may be a DC battery, such as a 12 or 48 VDC battery, or an AC/DC converter connected to a power outlet. Communication module is configured for enabling CPU module 200 to communicate with another CPU module 200 (i.e., a CPU module 200 controlling another shelf monitor 101, 111); with a computing device, such as a personal computer or a smart phone; and/or with a server. The electronics module may also include a next-shelf monitor connector (not shown), to facilitate communication between adjacent shelf monitors 101, 111. The electronics module may also include a series of indicator LEDs, further described herein.

CPU module 200 is configured for collection of measurements from sensors 201, communication with CPU modules 200 of other shelf monitors 101, 111, communication with a central server and/or a master controller (both further described herein), communication with a mobile device (e.g. smart phone, tablet, or installation maintenance tool) in order to provide or collect information from a staff member or a shopper. CPU module 200 may also communicate with humans using LEDs (further described herein) or other displays such as ESL, LCD, beacon, NFC, BLE. CPU module 200 may be independent or controlled by a central server (described herein). CPU module 200 may be connected to a smart TV, tablet, smartphone, POS, ESL, LCD, or any other display directly or through a network for reporting of results, e.g. sensors results and results requests from a mobile device.

Communication module, which can be wired or wireless, is used to forward information and commands between CPU module 200 and a master controller (further described herein).

Cloud Server

A central server for controlling lots of Wiseshelves and aggregators, it can be connected to a system to collect all shelves data, process shelf sensor data to determine product coverage/availability/type/location, enable remote control of the shelf, upgrade shelf sw/firmware, map physical and logical location of shelves, identify patterns when shelf is full or empty, data services for any shelf/shelf related application, integrate with 3rd party software such as POS/planogram/inventory/employees or customer smartphone/web store/exchange systems/cameras and more.

UUID

Universally unique identifier—a 128 bit identifier (rfc4122)

MQTT

MQ Telemetry Transport—"Internet of Things" connectivity protocol

Figure 5:
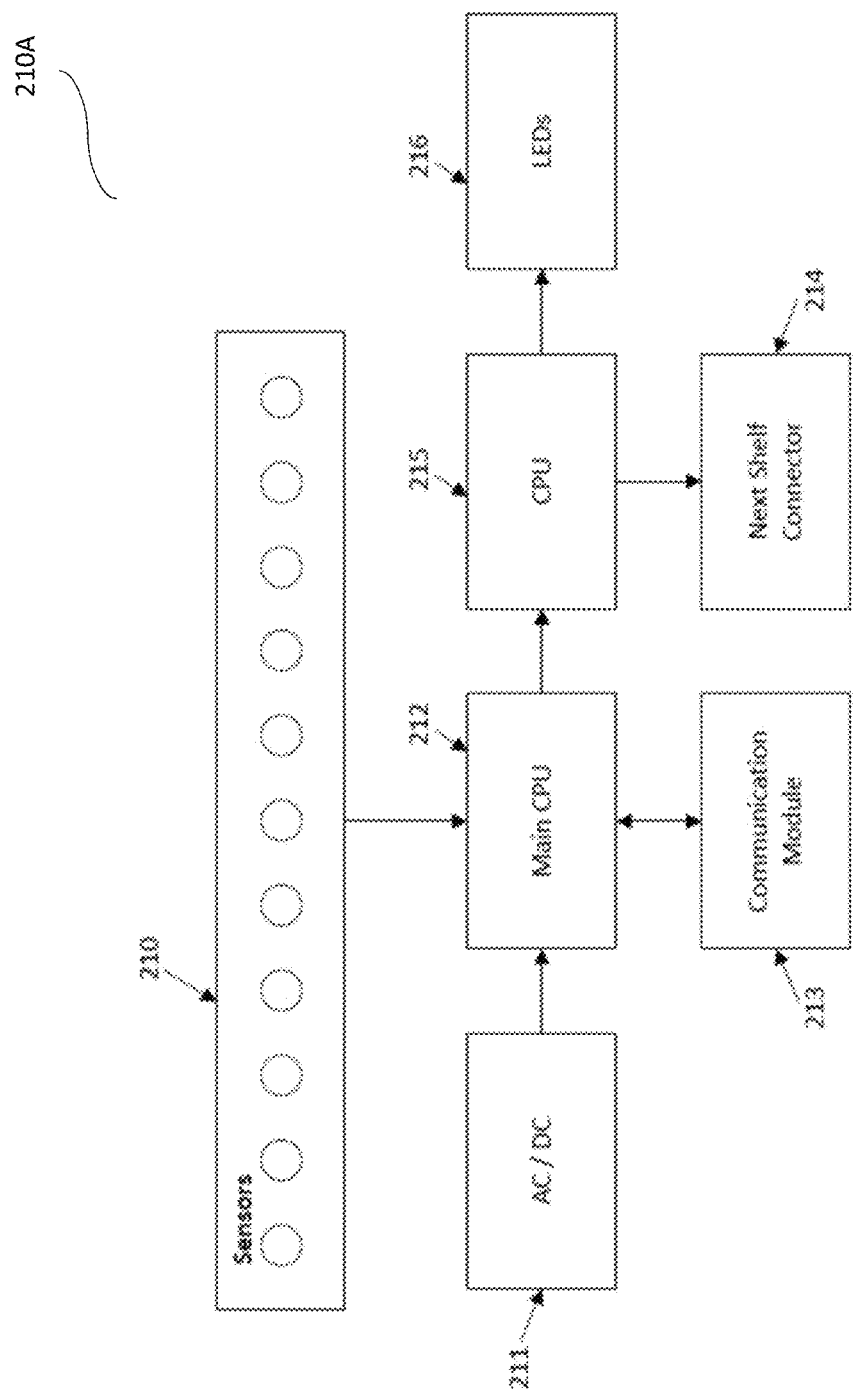
FIG. 5 shows a three-layer construction of a shelf monitor of a stock monitoring system, according to some embodiments of the invention.

Reference is now made to FIG. 5. In some embodiments of the invention, an electronics unit 210A contains an additional main CPU 212. In a preferred embodiment, Main CPU 212 is based on ZigBee Home Automation Gateway, model number CC2531EM-IOT-HOME-GATEWAY-RD. Main CPU 212 is configured for local control of a number of CPUs 200. Main CPU 212 is associated with a shelf monitor 101, 111, and may be integrated in shelf monitor 101, 111 or external to shelf monitor 101, 111. As an example, a shelf monitoring system 10 comprises 15 shelf monitors 101, 111, each with its own electronics unit 200A. Electronics module 210A of one of the shelf monitors—designated as a master shelf monitor, described further herein—has an additional main CPU for controlling local system functions.

Figure 6:
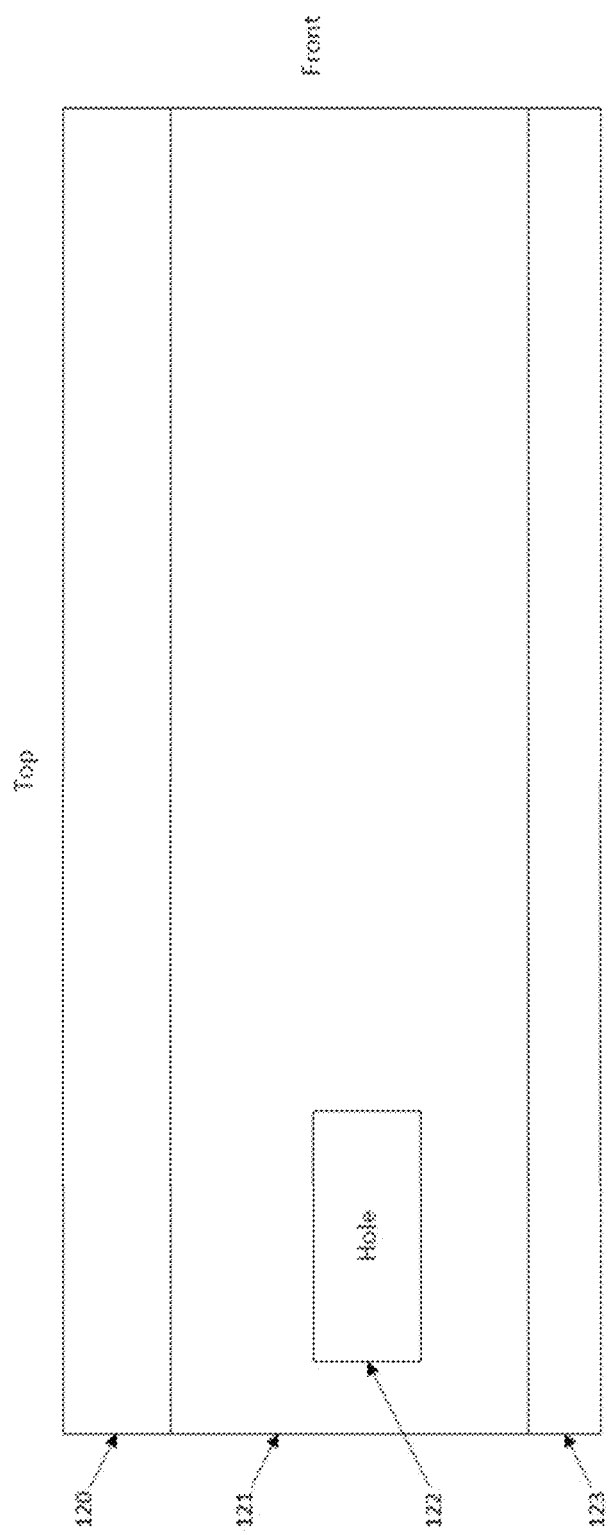
FIG. 6 shows a shelf monitor with a series of indicator LEDs, according to some embodiments of the invention.

Reference is now also made to FIG. 6. In a preferred embodiment, a shelf monitor 101, 111 is made in a three-layered construction. A top layer 120 hosts the sensors 112, a middle layer 121 houses modules of the electronics unit 200A, 210A. Middle layer 121 may also include holes 122 for mechanical and/or electrical coupling between adjacent shelves, e.g. insertion of male/female next-shelf monitor connectors for a daisy-chained power and/or communication configuration. A bottom layer 123 encloses and supports the electronics module.

Figure 7:
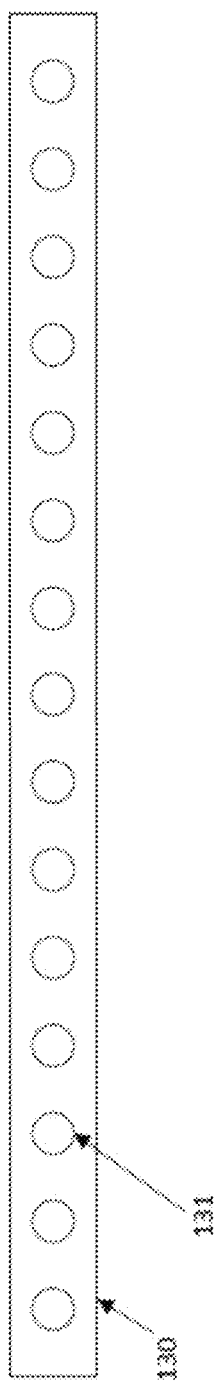
FIG. 7 shows a functional block diagram of a master shelf monitor, according to some embodiments of the invention.

Reference is now also made to FIG. 7. In some embodiments, an electronics module 200A, 210A may further comprise LEDs 131, mounted on a shelf monitor 130; for example in a row formation. LEDs 131 may be located in the front or on top of shelf monitor. LEDs 131 may be used, for example, in one or more of the following manners: to help locate a shelf, as a product promotion, as a planogram verification, to verify connectivity and health status of modules in the electronics unit 200A, 210A, to streamline QA processes, to send messages (blinking) to communicate with humans, and to communicate with cameras.

Figure 8:
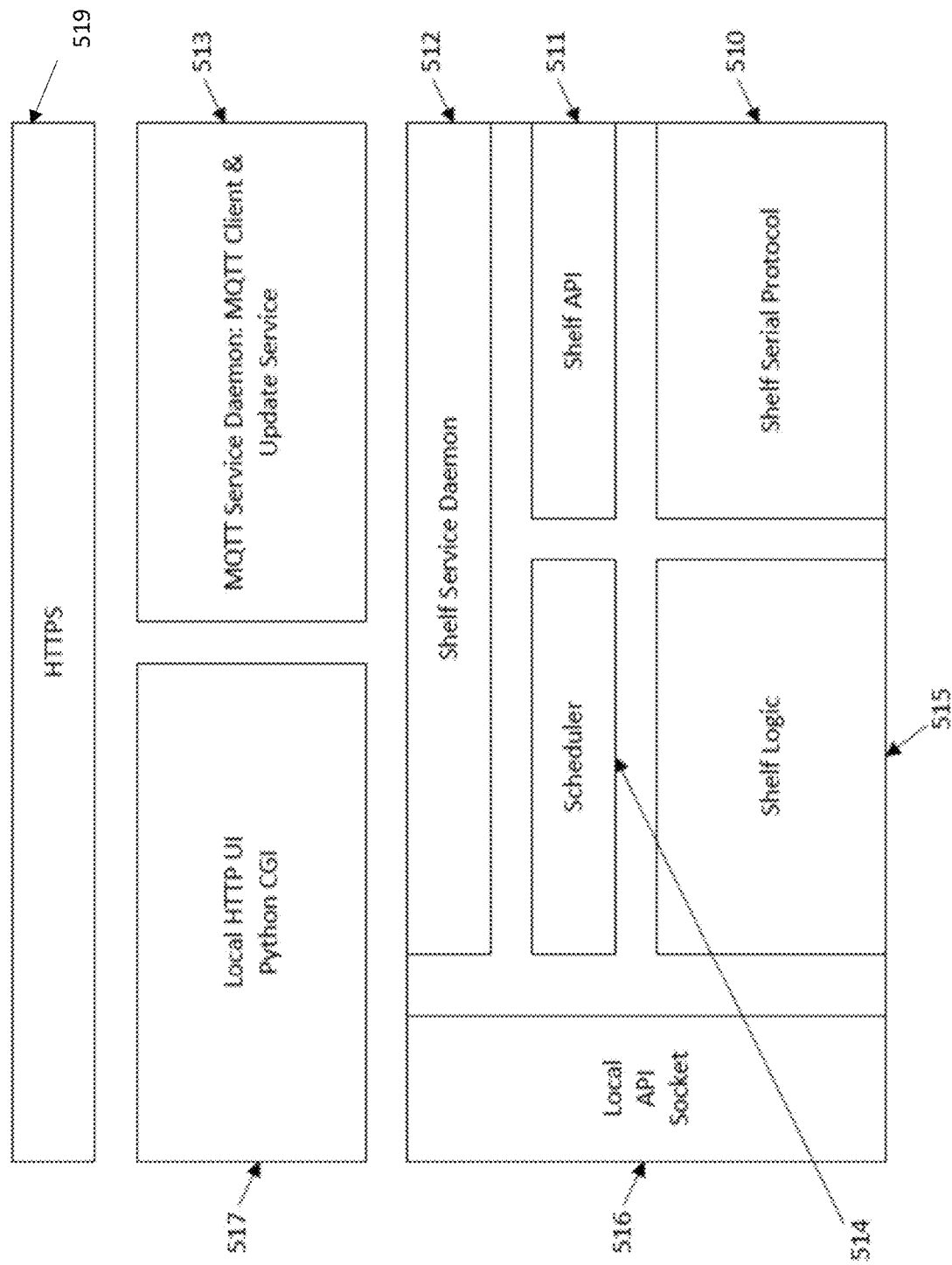
FIG. 8 shows an architecture of a master shelf monitor, according to some embodiments of the invention.

Reference is now made to FIG. 8. In some embodiments of the invention, stock monitoring system 10 comprises a master controller, also called an aggregator. Master controller xxx serves as a gateway to network connectivity for a CPUs modules of multiple shelf monitors of stock monitoring system 10. Master controller also provides a gateway for network connectivity to CPU modules 200 of shelf monitors. Master controller aggregates data, issues commands, and sends/receives status messages with multiple shelf monitors. Master controller can be a stand-alone module or may be associated with a shelf monitor (such as a master shelf monitor, described further herein), in which case it can be external to or integrated within the associated shelf monitor.

Master controller comprises a web server 519, which can be based on any suitable protocol such as HTTPS. Web server 519 is accompanied by a user interface (UI) 517, such as Python CGI; and a messaging protocol 513, such as MQTT service daemon including client and update service, to receive commands from a central server, such as a cloud server (described further herein). If associated with a master shelf monitor, master controller comprises a local shelf API 516 for communication with sensors 112, 201 LEDs 131, and other local resources of stock monitoring system 10. A scheduler 514 sets predefined tasks or modes. A shelf API 511 communicates with slave shelves (described further herein). A shelf logic module 515 is configured to create rules and patterns for the shelves and to collect data from the connected slaves. Communication between a master and slave shelf monitors is implemented, for example, by a shelf serial protocol 510, such as RS422, RS232, RS485, USB, or similar.

Figure 9:
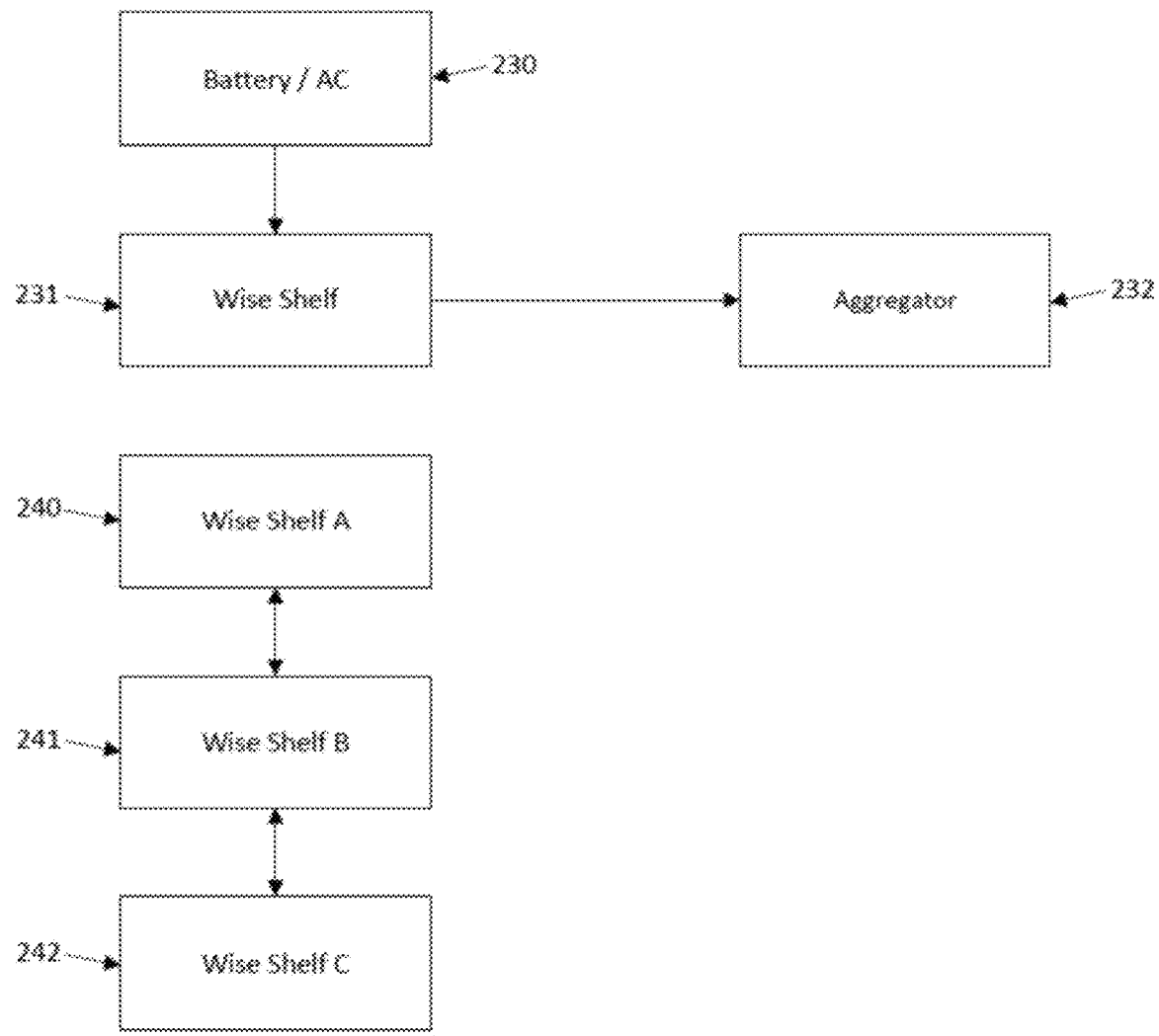
FIG. 9 shows a functional block diagram of a stock monitoring system, comprising a plurality of shelf monitors and a master shelf monitor, according to some embodiments of the invention.

Reference is now made to FIG. 9. A stock monitoring system 10 may comprise one or more shelf monitors 231 in communication with a master controller 232, either wired or wirelessly. Alternatively, shelf monitors 240-242 may each possess an ability to communicate directly with central server (further described herein). Optionally, communication modules of shelf monitors 231, 240-242 may be enabled to communicate with each other, either wireless or wirelessly. Optionally, power modules 230 of shelf monitors are external to shelf monitors 231, 240-242. For example, a single power module 230 may power a series of adjacent shelves connected in a daisy-chained configuration.

Figure 10:
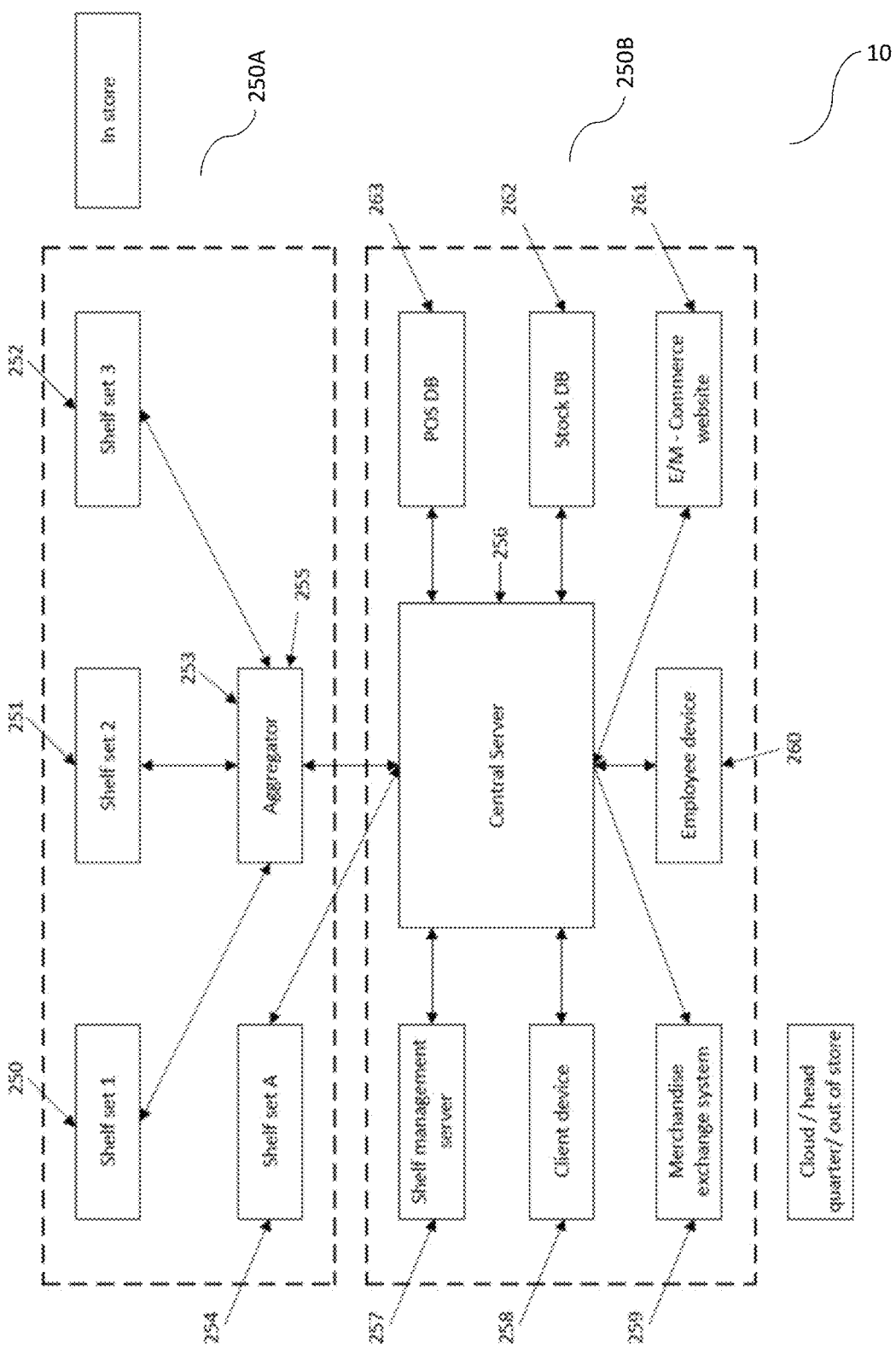
FIG. 10 shows an architecture of a stock monitoring system comprising a plurality of shelf monitors and a master shelf monitor, according to some embodiments of the invention.

Reference is now made to FIG. 10. In some embodiments of the invention, stock monitoring system 10 comprises an in-store sub-system 250A and an out-of-store sub-system 250B.

A retailer or warehouse owner could install shelf monitors 250-254 to monitor all of his shelves. Alternatively, he may choose special areas, e.g. stocking areas that suffer from out-of-stock issues, and place shelf monitors particularly there.

As a non-limiting example, shelf monitors 250-252 monitor three different stocking areas. Shelf monitors 250-252 are connected to a central server 256 through a master controller 255 but not connected to each other. Shelf monitors 250-252 monitor retail stocking shelves. Shelf monitor 254 monitors a shelf of a temporary promotion stand and is connected directly to central server 256. Shelf monitors 250-252, on the one hand, and shelf monitor 254, on the other hand, are seen to be used in very different scenarios, yet shelf monitors 250-254 are all parts of a single stock monitoring system 10.

One or more master controllers 255 and directly connected shelf monitors 254 in a store and/or warehouse are be connected to central server 256 or set of servers. The server(s) 256, which may not be located in the store is able to receive measurements from all sensors 112, 201 and to interpret the measurements to determine the amount of products on each shelf monitor 250-254 and the location of the product on monitored stocking shelf 100. Central server 256 may also be configured to determine each type of stocked item and its stock level, the expected date or level of need to order more of the item. Central server 256 may also be configured to generate alerts and to send jobs to the shelf monitors 250-254. Central server 256 may be in communication with a point-of-sale database (POS DB) 263, in order, for example, to determine the amount of products leaving the store for comparison with products identified as taken from stocking shelves 100. It may also connected to an inventory database 262, in order, for example, to identify in-stock products removed to a cross-merchandising display or to determine if there is stock in the warehouse to fill a retailing stocking shelf 100 with. It could be connected to an E/M commerce system 261, to identify whether a product ordered on-line is in stock or not. It could be connected to a merchandize exchange server 259, to identify sell/buy opportunities.

Central server 256 can be a source for data and to communicate with a technician, client (shopper) or employee (retailer). For example, a shelf management server 257 serves as an interface between central server 256 and a technician or employee; for example, to enroll a new shelf monitor 250-254, change a planogram, or provide data that is needed to manage the shelves.

The central server object 256, can optionally communicate with a client device such as smart phone 258, in order, for example, to help a shopper navigate within the store or advise a shopper about the location of a special promotion.

Central server 256 can be configured to monitor and report to shelf management server 257 the amount of products on stocking shelves, their location, the kind of products, and statuses of sensors 112, 201, controllers, power modules 204, 230, and communication modules.

The central server 256 can be configured to communicate with one or more employee's mobile or portable device 260. The employee could request information or transmit information to central server 256.

Figure 11:
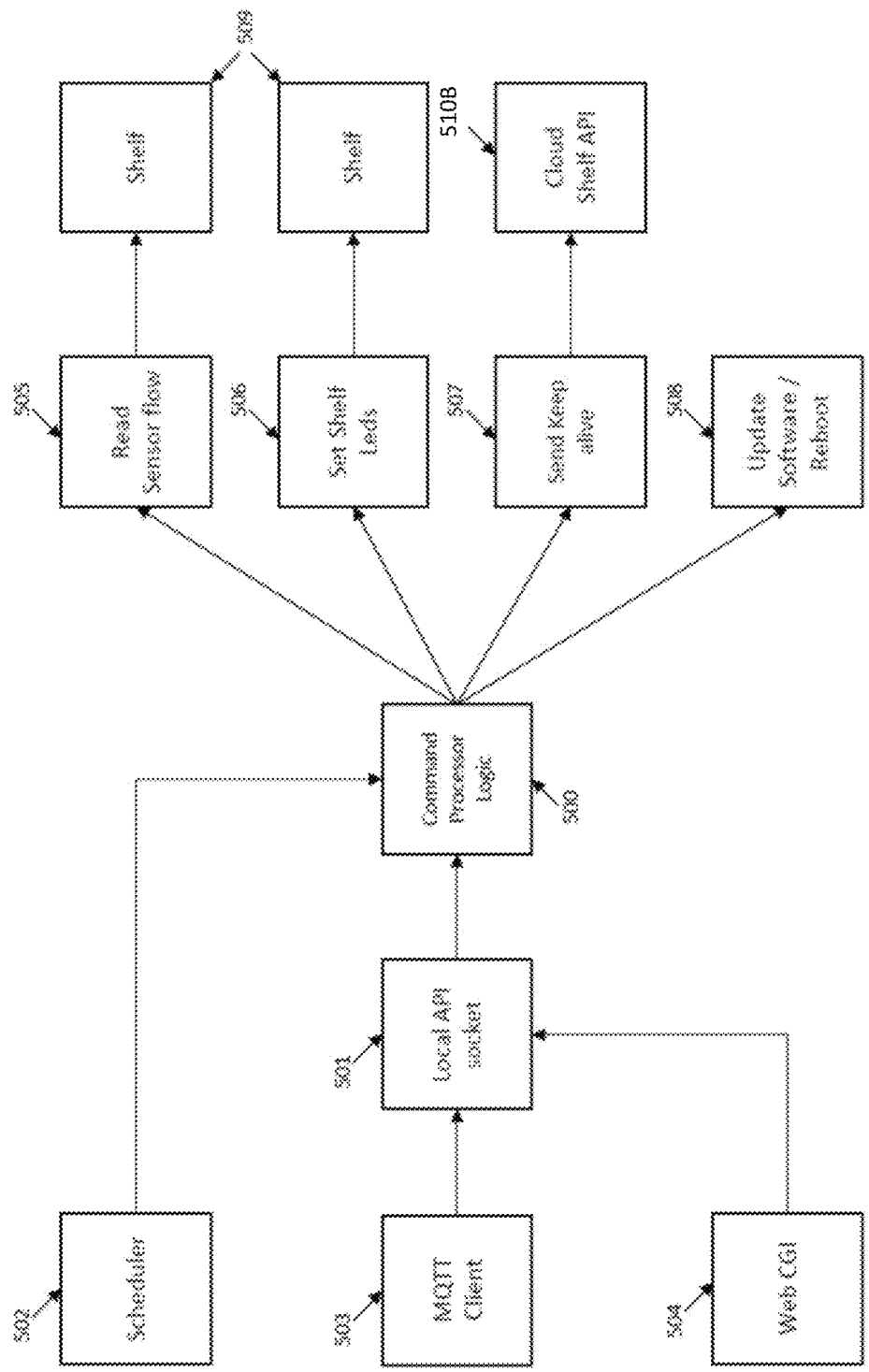
FIG. 11 shows command processing flow for a master controller, according to some embodiments of the invention.

Reference is now made to FIG. 11, showing command processing flow of master controller, according to some embodiments.

There are three types of communication between master controller and CPU module 200:
1. Sequenced mode: Employing a scheduler 502, master controller sends scheduled requests for measurements of sensors 112, 201 from client shelf monitors 509.
2. Command mode: An MQTT client 503 in master controller forwards a request to a local API 501 in master controller to do an operation on a client shelf 509. Local API 501 translates the request to a client shelf. Possible operations include displaying a planogram with LEDs 131 and a firmware update.
3. A message generated by Web UI 504 is sent for translation to local API socket 501.

All messages and commands are transferred to the command processor logic, object 500, which is responsible for parsing the command and dispatching a command handler 505-508.

Handlers 505-508, are dispatched and communicate with CPU modules of 509 or with cloud shelf API 510B according to flow.

Figure 12:
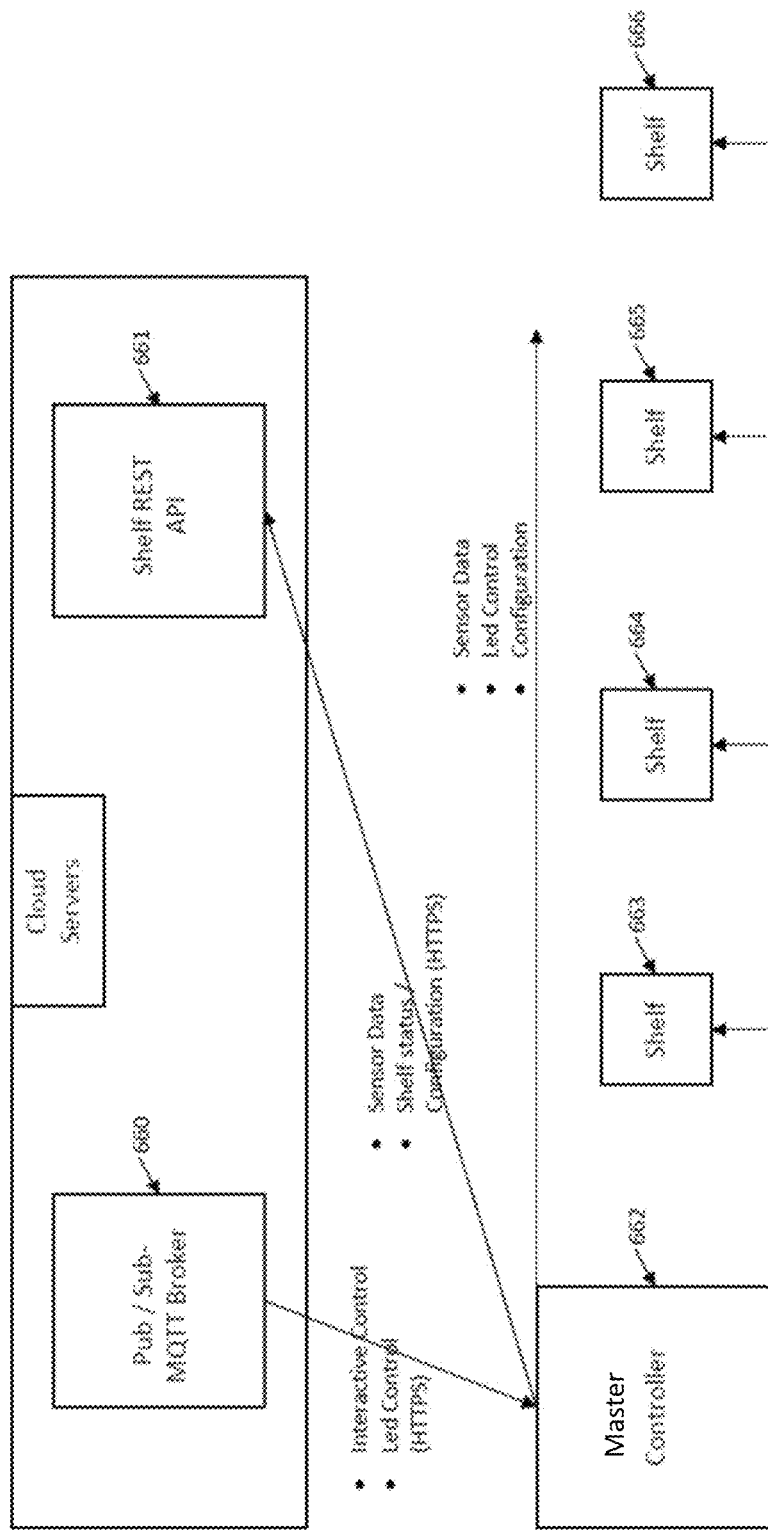
FIG. 12 shows a high level communication flow between cloud server, master controller, and shelf monitors.

Reference is now made to FIG. 12, showing high level communication flow between cloud server, master controller, and shelf monitors.

Cloud server has two interfaces to connect to master controller:
1. Shelf Rest API 661 is used by master controller 662 to send sensor raw data, Shelf CPU status monitoring (keep alive), configuration fetching, and error reporting to the cloud server. API is available, for example, over HTTPS, as standard rest API (could be implemented in nodeJS) the rest API reads the following data to determine which shelf monitor 663-666 is reporting or what master controller 662 is reporting.
2. Pub/Sub MQTT Broker 660: CPU modules of shelf monitors 663-666 subscribe to relevant topic (based on its ID) and receive commands such as "Set LEDs", "Identify", "update software." CPU modules of shelf monitors 663-333 can publish a response or react through REST API 661.
    a. Connection is implemented using industry open source MQTT broker such as Mosquito or AWS IoT,
    b. Publishing to CPU modules of shelf monitors 663-666 is implemented by a Cloud API backends Here are some examples of possible commands between central server and master controller:

Set LEDs—could be a command to the shelf CPU, object 200, to light up a LED 131 in the front of the shelf in a particular color. Could be used for several uses.

Identify—could be a command to help installer make sure whom is the shelf in front of him/her.

Update software—could be a command to update the firmware of the aggregator CPU or shelf CPU.

These are some characteristics of communication between shelf monitor and master controller:

Master controller serves as gateway for cloud communication

Communication is done via Serial protocol (RS422/RS232/RS485 or similar)

Figure 13:
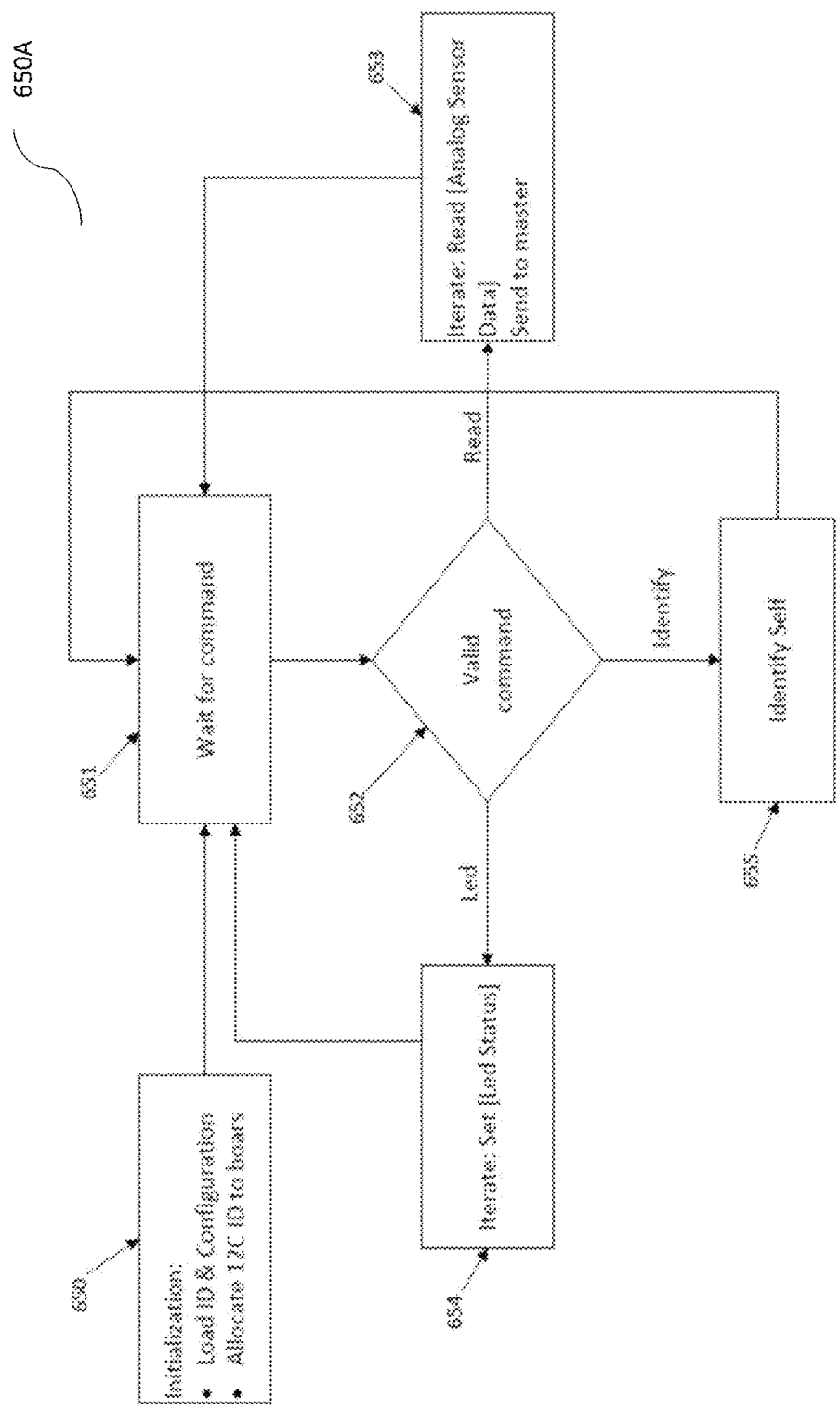
FIG. 13 shows a control flow method 650A of a CPU module of a shelf monitor commanded by a master controller

Master controller handles timing of polling of shelf data and makes the decision when to pass data the Cloud Shelf APIs Reference is now made to FIG. 13, showing a control flow method 650A of a CPU module of a shelf monitor commanded by a master controller.

Control flow method 650A begins with initializing 650. CPU Initialize Serial (for master communication), Init I2C, test connectivity and assign address to all slave boards (I2C protocol).

Control flow method 650A includes waiting for an incoming command 651 from a CPU module to a serial port of the master controller. The command includes an ID number of the CPU module.

Control flow method 650A includes checking if the incoming command is valid 652, including verification whether "the command is for me." If the command is not valid, it is ignored and serial buffers are flushed.

If the incoming command is valid and "for me," the method proceeds according to the command: Identify, LED, or Read.

Identify

Control flow method 650A proceeds by identifying a stocking shelf 100 by blinking the corresponding shelf monitor's LEDs 655, in order for an employee/technician to identify the shelf.

LED

Control flow method 650A proceeds by setting the status displayed by the LEDs 654, for example by setting LEDs to a particular color.

Read

Control flow method 650A proceeds by sending measurements from sensors of the shelf monitor to the master controller 653.

Figure 14:
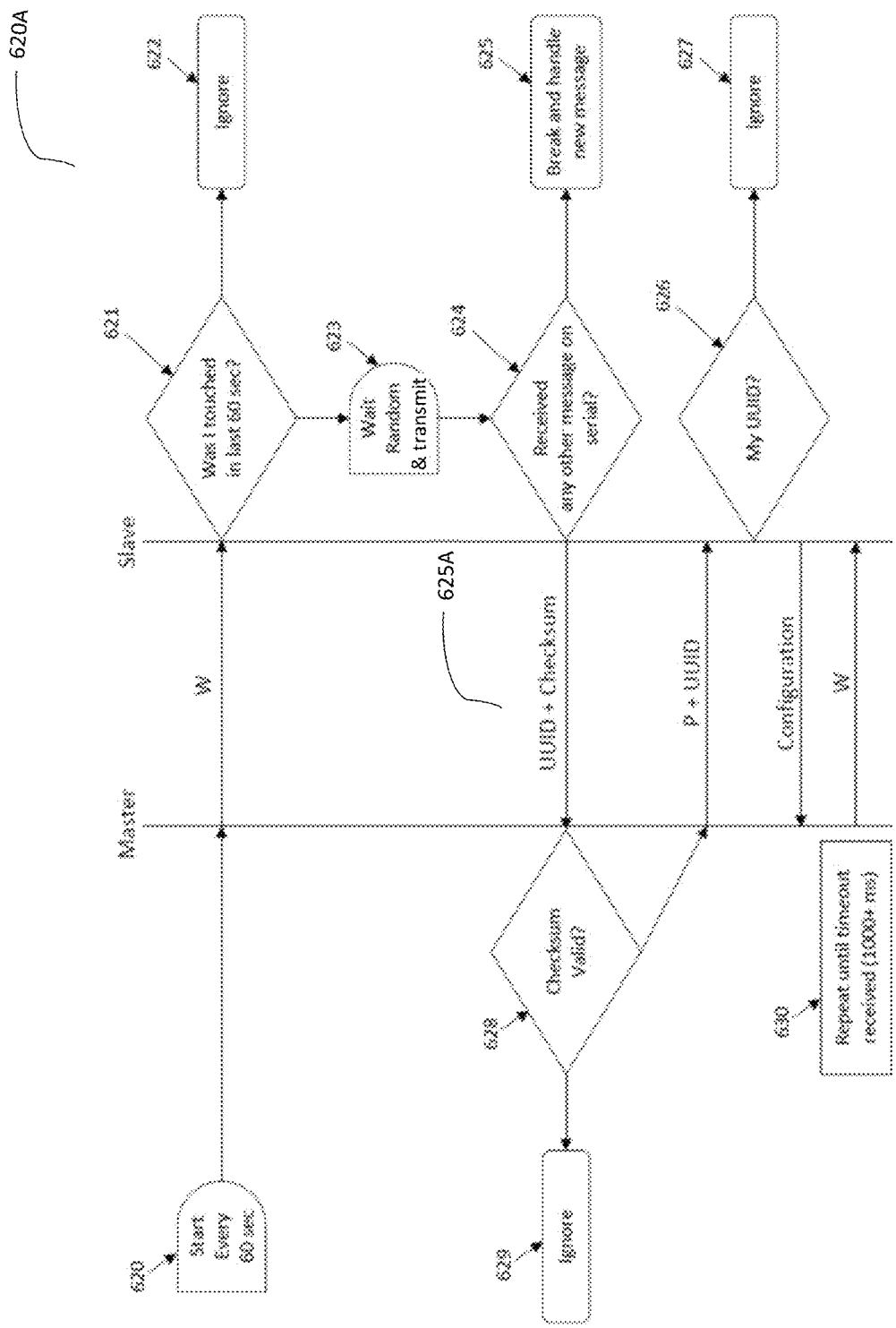
FIG. 14 shows a slave identification method 620A between a master controller (master) and a shelf monitor (slave).

Reference is now made to FIG. 14, showing a slave identification method 620A between a master controller (master) and a shelf monitor (slave). In some embodiments, a subset of the steps described below are performed.

The slave identification method 620A includes starting a communication cycle 620, for example starting a cycle every 60 seconds.

The slave identification method 620A includes the master asking a slave if the monitored shelved stock 100C 100C was touched within the last 60 seconds 621, i.e. if one or more sensors of the slave have changed in measurement value.

If none of the slave's sensor measurement values changed, then slave identification method 620A proceeds by ignoring the request 622.

If the value of a slave's sensor measurement has changed, then slave identification method 620A proceeds by transmitting the slave's sensor measurement data after a random wait of not more than 1000 ms 623.

During the random-interval wait, slave identification method 620A may proceed by receiving new messages by the slave over the slave's communication port 624.

If a new message is received, communication protocol method 620A proceeds by terminating the waiting step, handling the new message 625, and sending of the slave UUID and the message checksum back to the master 625A to ensure it got the right message.

After sending 625A, slave identification method 620A proceeds with checking, by the master, of the parameters and comparing them to those sent by the master 628.

If the parameters do not match, slave identification method 620A proceeds with ignoring, by the master, of the data sent by the slave 629.

If the checksum is valid, slave identification method 620A proceeds with sending, by the master, of the master the slave a request (P) to its UUID.

Slave identification method 620A proceeds by verifying, by the salve, that the message is directed to its UUID 626, executing and sending configuration data. If UUID doesn't match, the slave is ignoring the message 627. The communication could repeat until 1000 ms timeout, 630.

Figure 15:
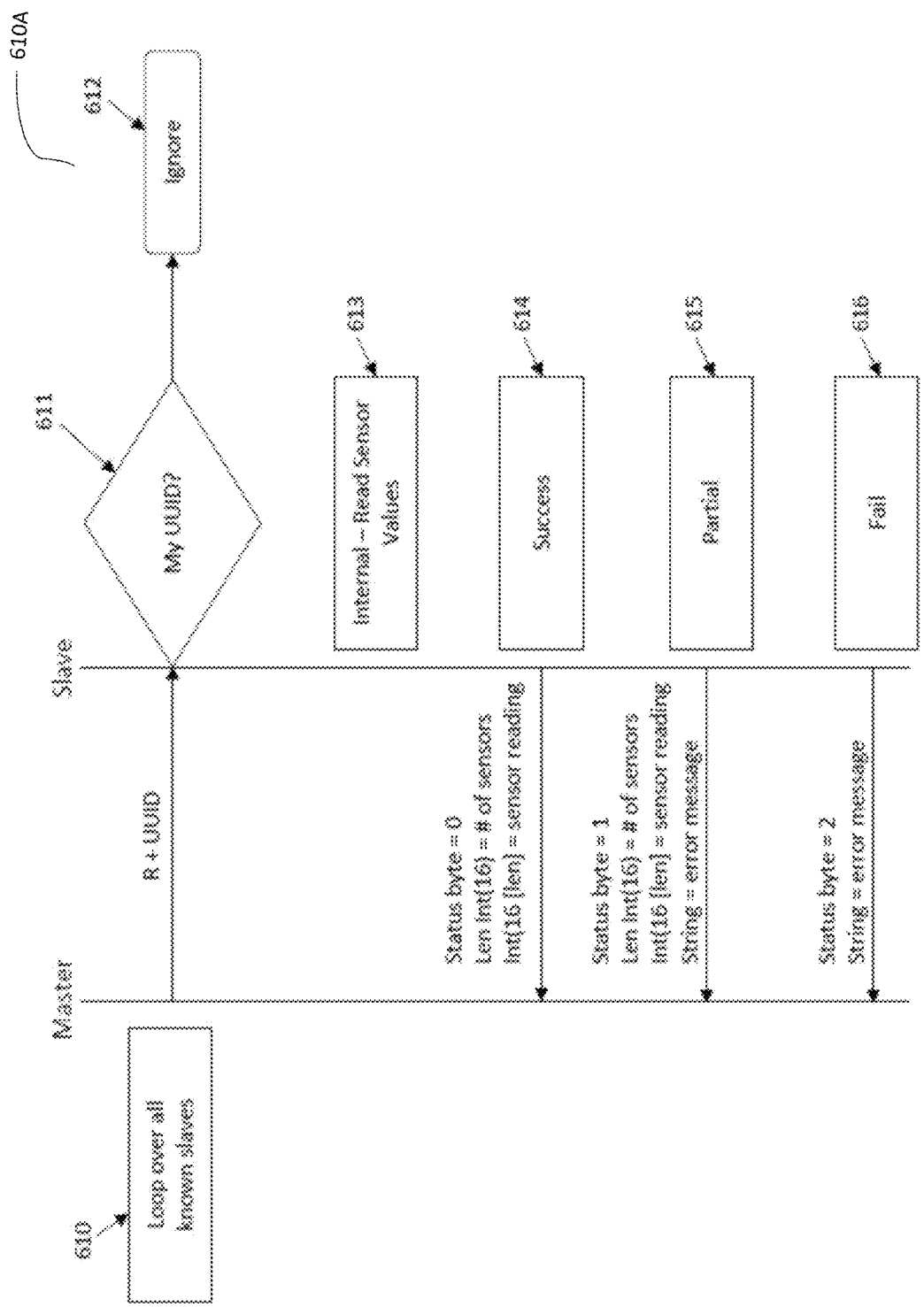
FIG. 15 shows a sensor reading protocol 610A according to some embodiments of the invention.

Reference is now made to FIG. 15, showing a sensor reading protocol 610A according to some embodiments of the invention.

Sensor reading protocol 610A begins with sending by the master of a read command and UUID to each slave 610.

Upon receipt of the command, sensor reading protocol 610A proceeds with checking by the slave of the UUID sent 611.

If the UUID is correct, sensor reading protocol 610A proceeds with reading by the slave of all measurement values of the sensors in the slave shelf monitor 613. If the UUID does not match the slave, the slave is ignoring the message 612.

Then the slave could return a message to the master, if all sensors return a value, the message is success 614. Its number is 0 and it includes the number of sensors and its values, Up to 16 sensors in a message.

When some sensors return a value and some not, partial success 615, than the slave returns a message which include: message number, 1, number of sensors, sensors values and an error string.

When no sensor returns a value than read fails and the message returned 616 and it includes status number 2 and error string.

Figure 16:
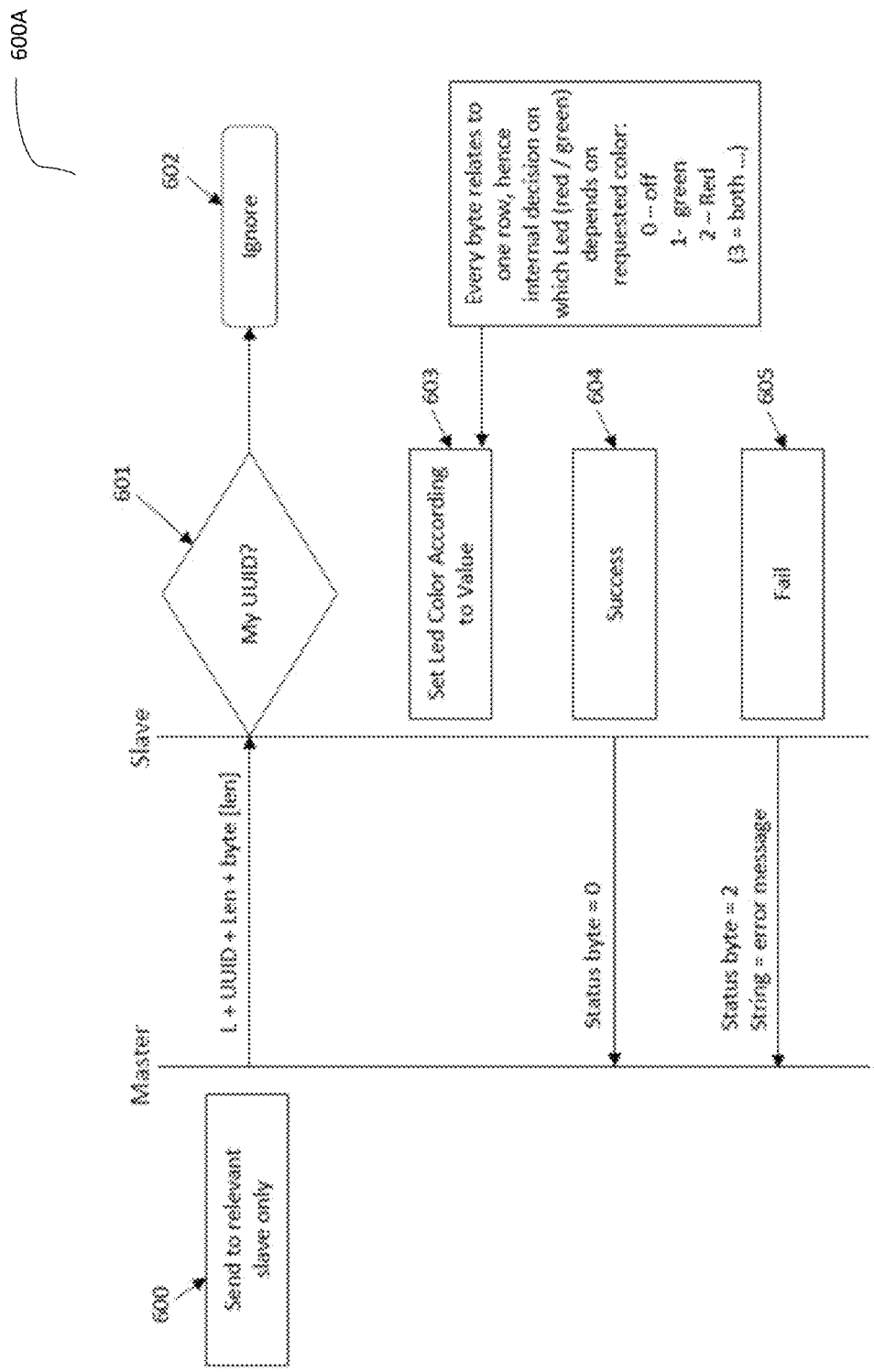
FIG. 16 shows an LED control method

Reference is now made to FIG. 16, showing an LED control method 600A. The master could also start/stop or blink LEDs, in order to send a request to change LED status it will send a message to the relevant slave 600. The message name is L and it will include the UUID of the slave, the number of LEDs and the values for every LED.

When the slave gets the message it checks the UUID 601. If the UUID doesn't fit the slave it ignores the message 602. Ff the UUID matches the slave it sets the value to the LEDs 603. For example, 0 is set for off, 1 sets for green, 2 sets for red and 3 sets for orange. In case the LED is RGB the list of colors could be longer.

After the slave set the colors to the LEDs it returns to to the master with a success or fail message. A success message will be 0 604 and the fail message number is 2 605.

One of the great challenges when working with light sensors is the frequent changes in light levels, changes that the human eye cannot see. In order to solve it the slave shelf would like to have low amount of different light levels so it won't be sensitive to the small changes. But on the other hand there are also shadows when one product exist but the one beside it is missed, in this case the product which exists make a shadow on the zone of the missing one.

So in order to identify a missing product when the sensor doesn't get full light, the sensor needs to be very sensitive with lots of light levels. In order to make a smart and adaptive algorithm to identify removed products correctly, the CPU module is configured to execute a calibration process.

Figure 17:
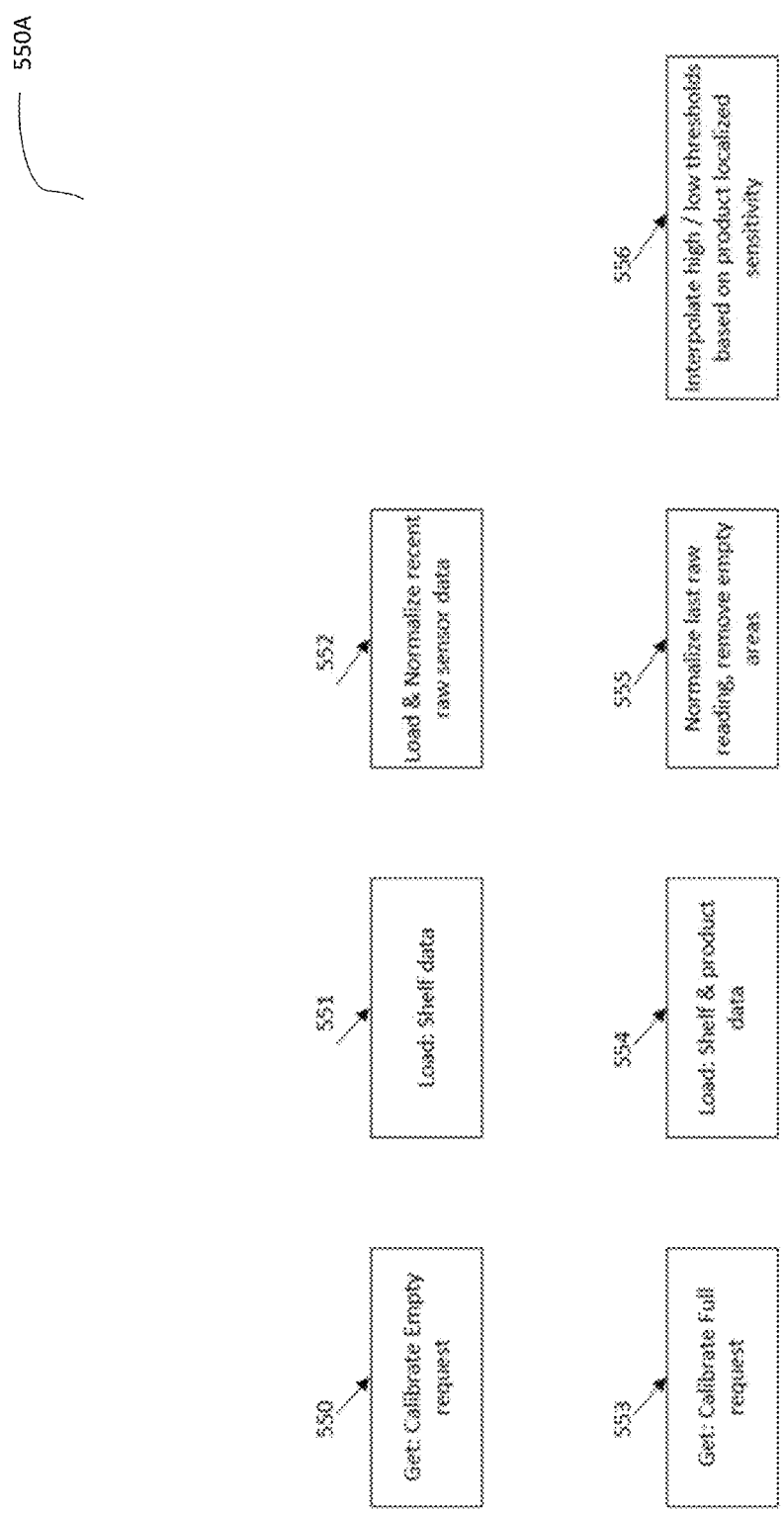
FIG. 17 shows a method for calibration of a shelf monitor.

Reference is now made to FIG. 17, showing a method for calibration of a shelf monitor 550A.

Calibration method 550A begins with measuring an empty shelf 550 in order to get maximum light levels to the sensors of a shelf monitor.

The slave shelf sends the data 551 and the cloud server saves raw data and normalizes the raw data for farther calculations 552.

Calibration method 550A proceeds with measuring of a full shelf 553, where the stocking shelf 100 is filled with products. The shelf monitor loads the data to the cloud server 554. The filled-shelf sensor measurement values help the calibration module to identify which sensors are not covered by products because of their shapes and what is the levels of light penetrate the depth of the shelf and to set a level of transparency, object 555. All this data enters into the calibration module and translated into high/low levels and their standard deviation 556.

In addition to a sensor reading protocol 610A, there is also a method of reading sensor measurements.

Figure 18:
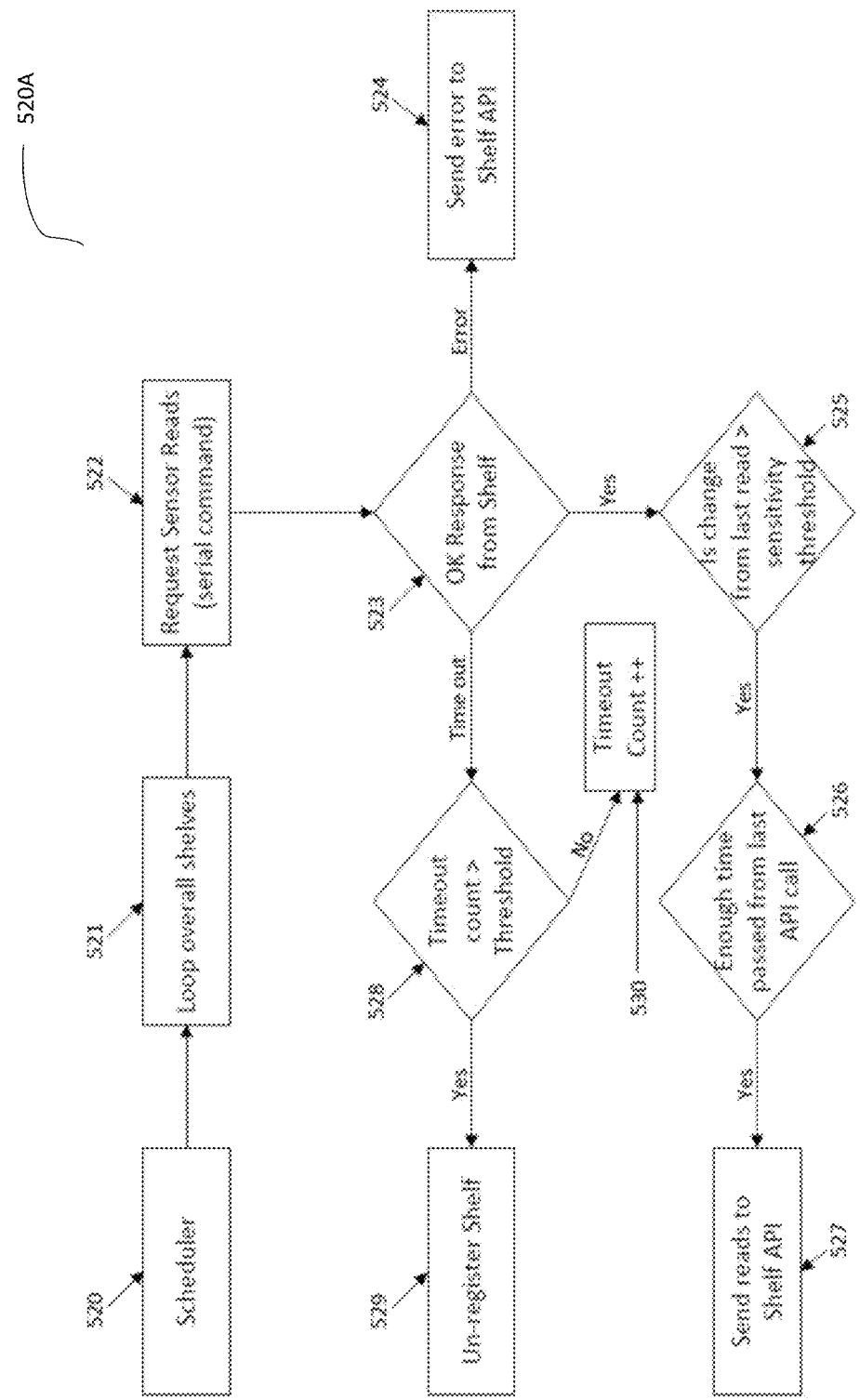
FIG. 18 shows a method of reading sensor measurements.

Reference is now made to FIG. 18, showing a method of reading sensor measurements 520A. Sensor reading method begins with starting, by the scheduler 520, when the store is opened or at some predefined time. The master loops all shelves 521 and requests for sensors data 522, using serial commands. Following a request is the shelf responds 523. It could respond with an error through shelf API 524. It could respond in a delay 528. If exceeding a timeout threshold while counting a time out 530, the master shelf unregister the slave 529. When the master gets an answer it checks the sensors with updated value compared to the previous readings 525, and notes if differences exceed a certain threshold margin 525. If yes, the master checks how much time passed from last API call 526, and sends another read request 527.

Measurement of inventory on a stocking shelves includes measurement of the amount of products located on each shelf, the location of the products, the preferred location on customers, the kind of product items on each shelf, the amount of products in the stock room, and the location of the products in stock room. The inventory management system also includes identification of products in stock and verifying their location and planogram verification after a shelf is organized or filled.

Figure 19:
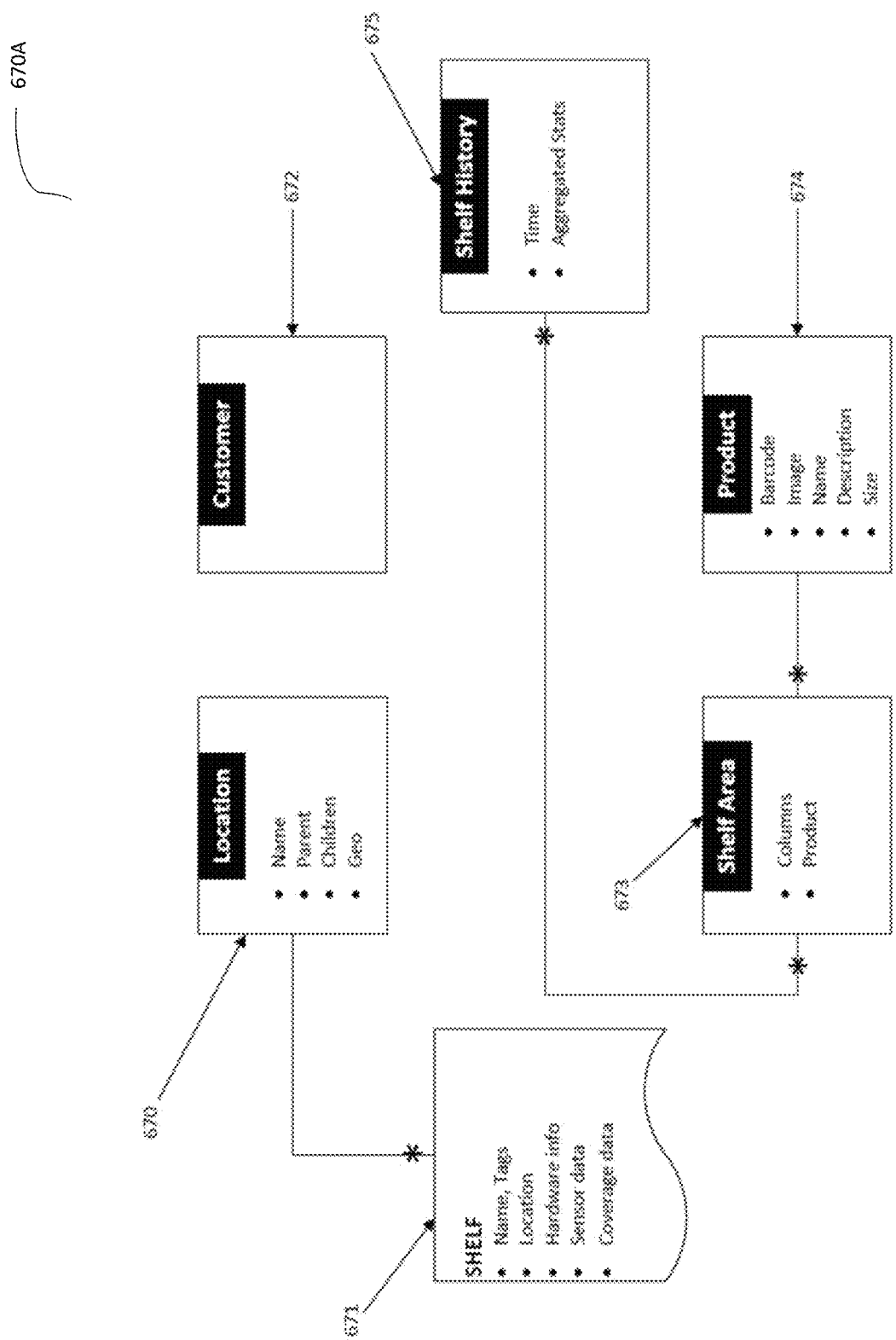
FIG. 19 shows a characterization of the inventory/shopping environment.

Reference is now made to FIG. 19, showing a characterization of the inventory/shopping environment. When a stocking shelf 100 enrolls to the cloud server 256 it is characterized using a group of parameters 670A.

The shelf is connected to a customer, object 672. A customer is associated with a location 670; it could be a store or a department in a store. Location 670 could have several parameters such as name of the location, its parents and children and its geographic coordinates. After a location 670 is set, stocking shelf 100 could get a shelf identification 671, comprising a unique identification code could, which could be one or more of the barcode on the shelf, a name, a tag, a specific location, hardware information such as the number of sensors and the number of LEDs and more. In addition, a stocking shelf 100 has its own areas 673 and associated products 674, including but not limited to images, size, barcode, name, and columns and rows. A shelf history 675 may include a history of sensor measurements; shelf history 675 is listed with the shelf data 671, 673, 674 in the cloud server 256. Shelf history 675 can be listed with a time stamp and with cumulative statistics.

Figure 20:
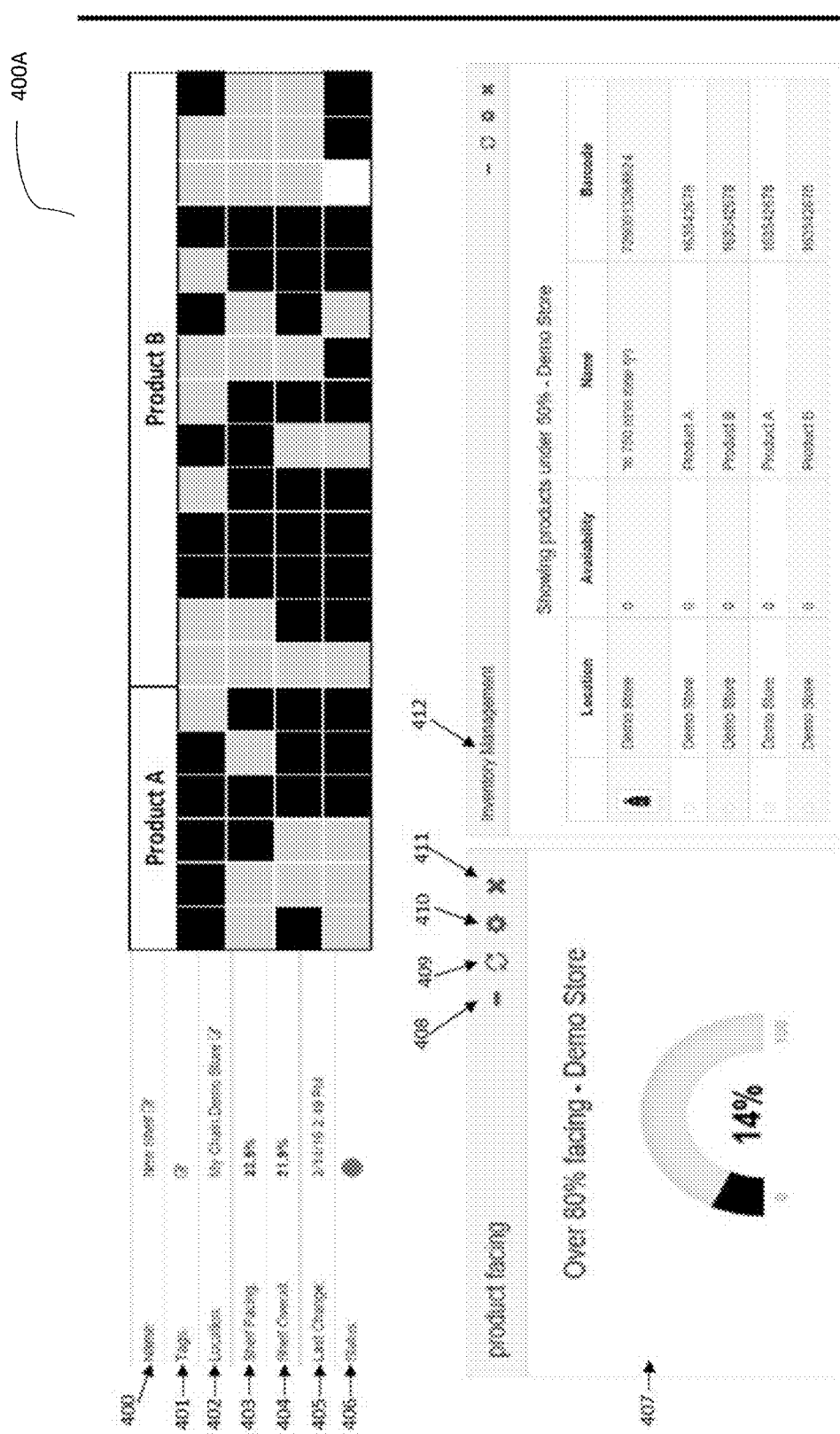
FIG. 20 shows a user interface 400A of shelf characterization in cloud server

Reference is now made to FIG. 20, showing a user interface 400A of shelf characterization in cloud server 256.

Shelf parameters are monitored in real time. User interface 400A includes columns for shelf name 400, shelf tag 401 such as barcode, shelf location 402, shelf total facing, object 403, and all facing areas with an identification of the area status. Shelf's overall, object 404 and the current status of every area in the shelf and the product that covers it. In addition every shelf has a log for last reporting date and time, object 405 and its status such as on line or off line 406.

In addition to the shelf identifiers the user interface will show other ways to visualize the shelf status and tasks to the employees. Such visual tools could be facing level, object 407, bar or a table with the products parameters and the number of products to fill, object 412.

Every bar could be minimized, object 408, refreshed, object 409, set to certain departments/shelves/stores, objects 410 or can be closed by object 411.

Shelf characterizations may be used used for:
1. Alerting a manager if there is a difference between the amount in stock and the amount identified on the shelf
2. Alerting about low facing or low number of products.
3. Translating light changes to inventory measurement
4. Recommendation to upgrade planogram planning.
5. Communicating with digital signage devices to show signs that are relevant to the location
6. Communicating with customers' computing devices to authenticate on-shelf payment
7. Communicating with customers' devices help them navigate
8. Navigating employees mobile devices A suggested training method is to collect and actualize information from the shelf by one or more of measuring the light strength at each point on a stocking shelf 100, measuring the pressure of the product on the shelf, by other wireless sensors, or by any combination thereof.

The advantages of using light strength:
1. Location tracking.
2. No need to recalibrate after a power failure.
3. Light levels are generally high in stores, for marketing reasons, so light-level changes, e.g. a malfunction of a lamp, has almost no impact on the amount of light illuminating the shelf.
4. Lights are always on during opening hours.
5. Light sensors, such as photodiodes or photoconductive cells, are common light measuring components and are very cost effective compared to other detectors, therefore more sensors can be installed for resolution.
6. Light sensors may be installed inside a shelf with detection to the shelf below, in order to prevent damage by items leaking liquids on the shelf.
7. The light detector is very sensitive to light changes therefore it is suited for different type of products such as boxes, dark products and bright liquids.

The method of measuring light strength is innovative for the use of stock levels. The system collects a lot of information from the sensors and compares to calibration levels collected in the setup procedure and to the level of the close sensors under the same product. Then it is able to decide if there is a product facing the sensor or not.

The light sensors should identify the amount of product and their location for facing report.

CPU module manages the sensors, collects data and transfers it to the server. The CPU also manages other interfaces such as proximity (NFC/BLE), communication interface such as WI-FI or zigbee, and manages power of the shelf.

The CPU module could have a protocol to identify every light sensor.

Another impact of the shelf is on navigation in the store. Today in order to create store navigation, retailers need to install short range wireless detectors such as BLE detectors every half a meter in a store so the detectors could communicate between themselves and follow a shopper's path.

With the system describe here the BLE, which is a type communication module 213, is part of the shelf and can transmit data to the server by the shelf wireless module, therefore navigation sensors are needed only at ends of aisles.

In some embodiments, the invention also deals with the proximity sensor located in the plate and in the customer mobile device or employee mobile device. This proximity sensor or sensors could have a whole set of services to the employee and to the customer.

Such services for the employee could be:
1. One proximity detection of employee device could allocate the shelf for the employee, so that products may be listed to the employee so he could verify planogram check for missing product.
2. Two proximity detections could lead to planogram change but not limited to it.
3. Three proximity detections could lead to technician identification.

Such services for the customer could be:
1. One proximity detection could be a request for prices of products on a shelf.
2. Two proximity detections could be a request for personalized special deals.
3. Three proximity detections could be a request for recommendation on the use of products on the shelf.

The invention can also deals with the impact of the shelf on digital signage devices. Such devices could be connected to the shelf to promote products visually, those promotion screens could be movable between shelves using a simple railroad and the shelf could communicate with the screens to change the promotion according to the location. Such flexibility is very important as the digital signage screens are expensive and it is a great challenge to the retailer to multiply their use for shoppers' needs.

The invention can also make the screen easier to maintain: data could be downloaded remotely. It is also very important to make sure the right promotion is on the right screen.

Figure 21:
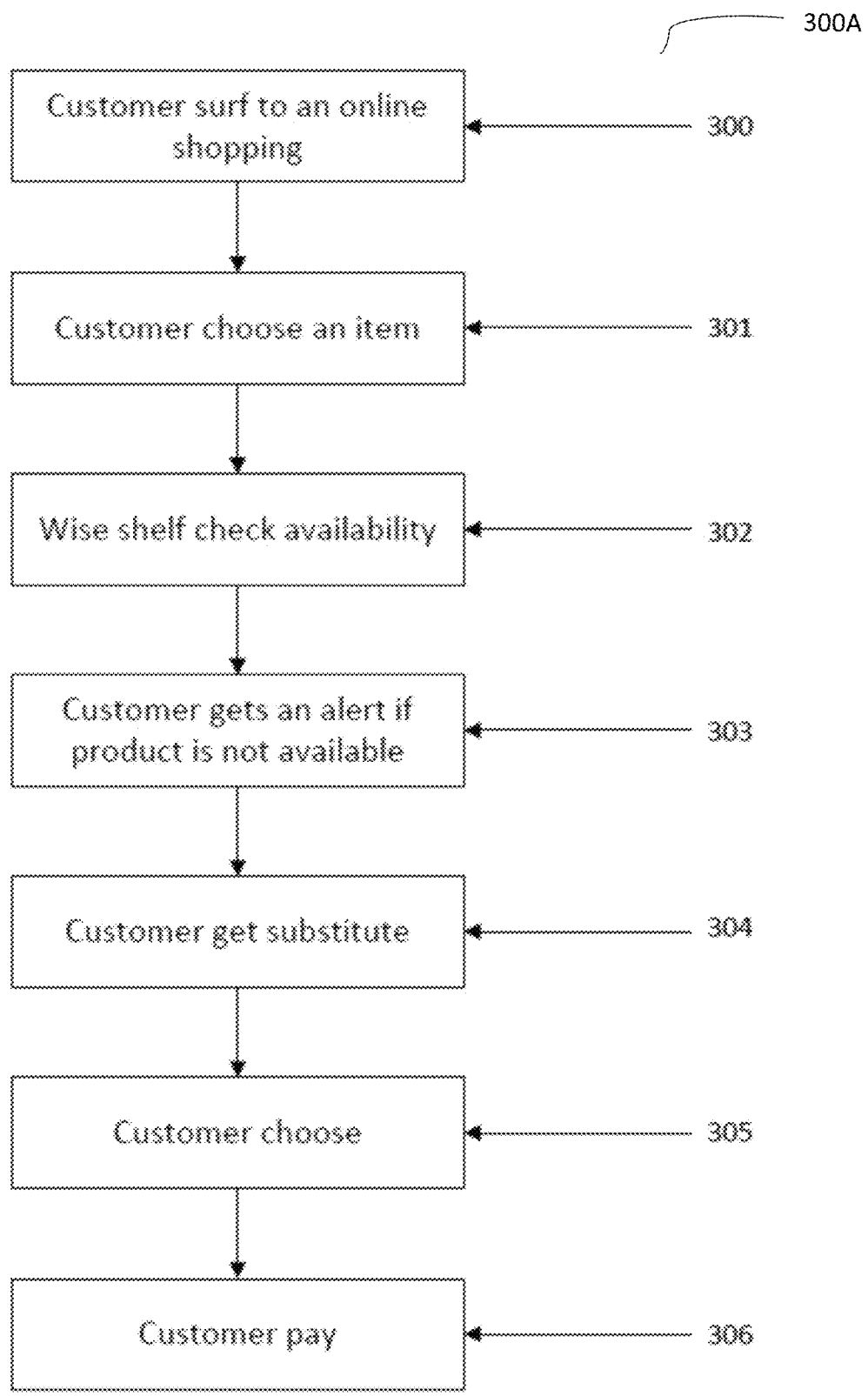
FIG. 21 shows a method for buying on-line.
Figure 22:
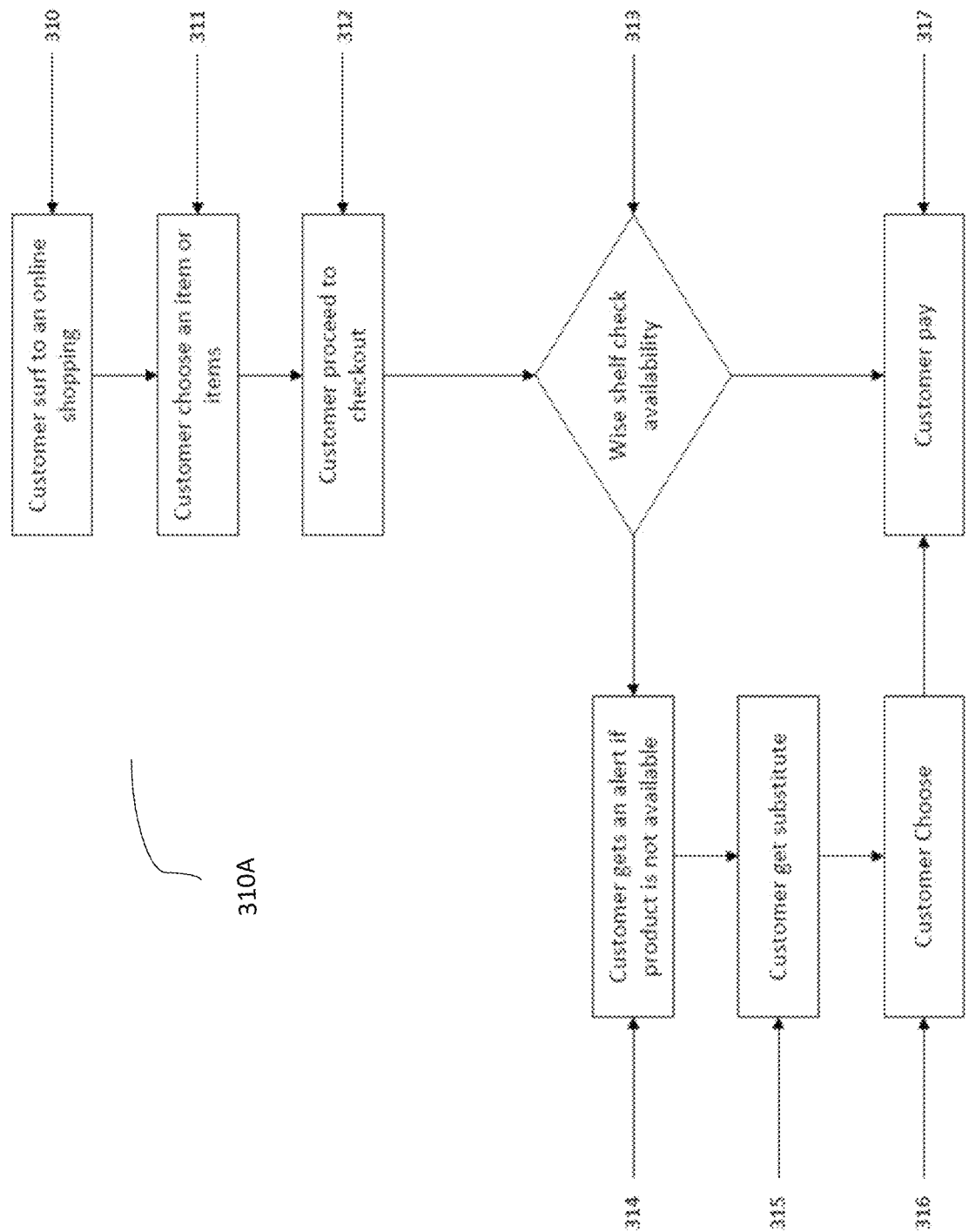
FIG. 22 shows another method for buying on-line.
Figure 23A:
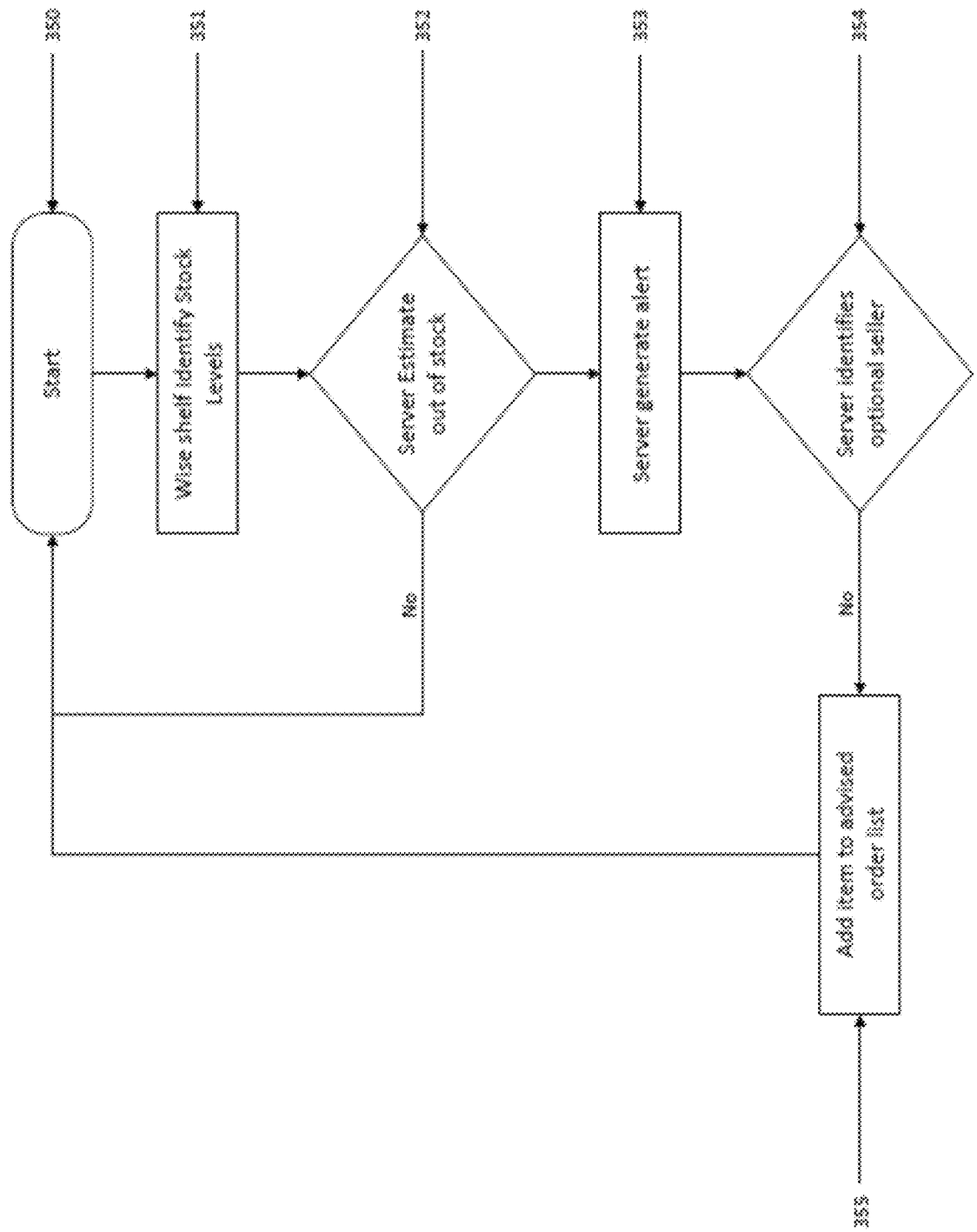
FIGS. 23A-23C shows a method to manage the movement of products between stores.
Figure 23B:
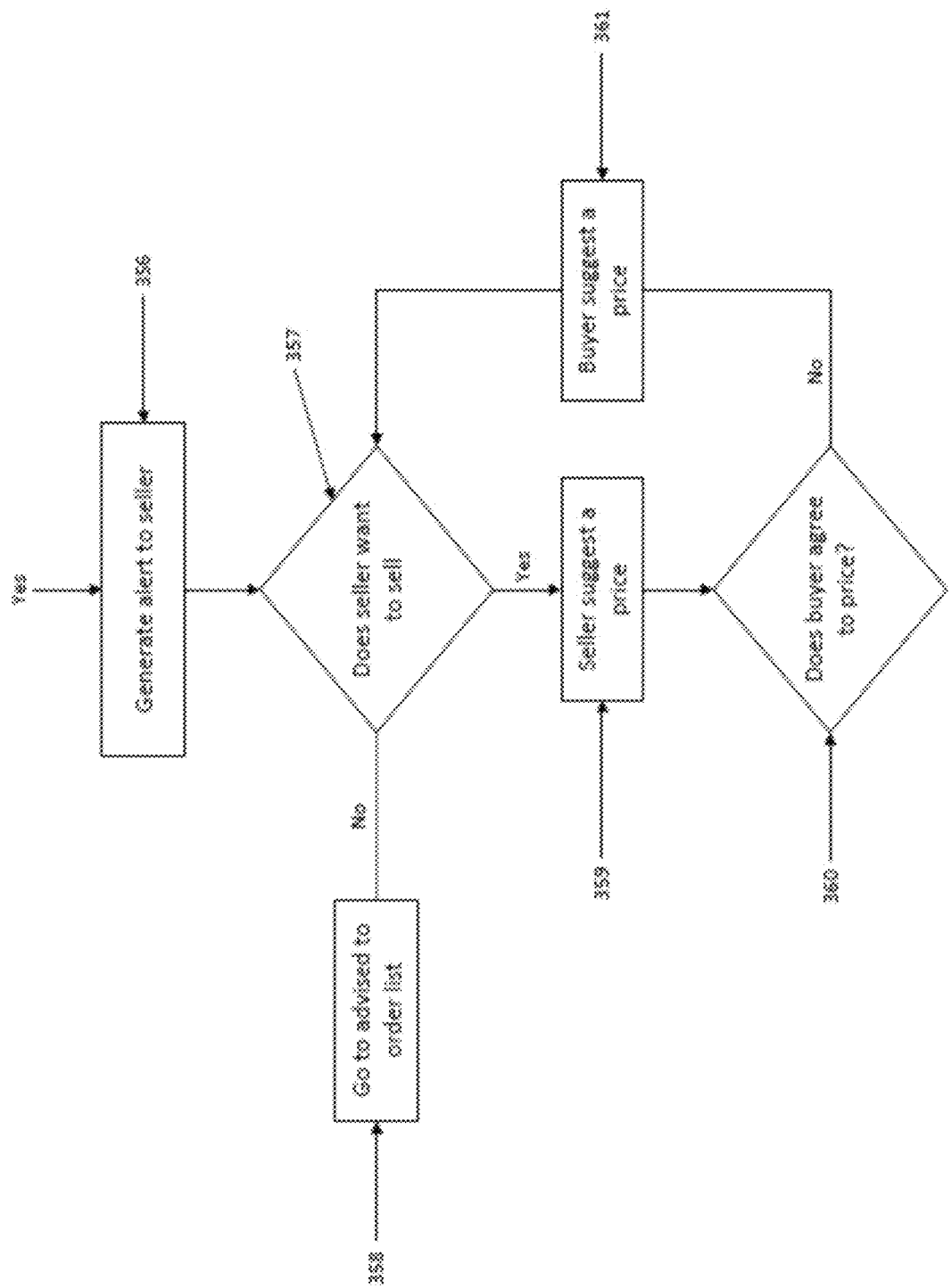
Figure 23C:
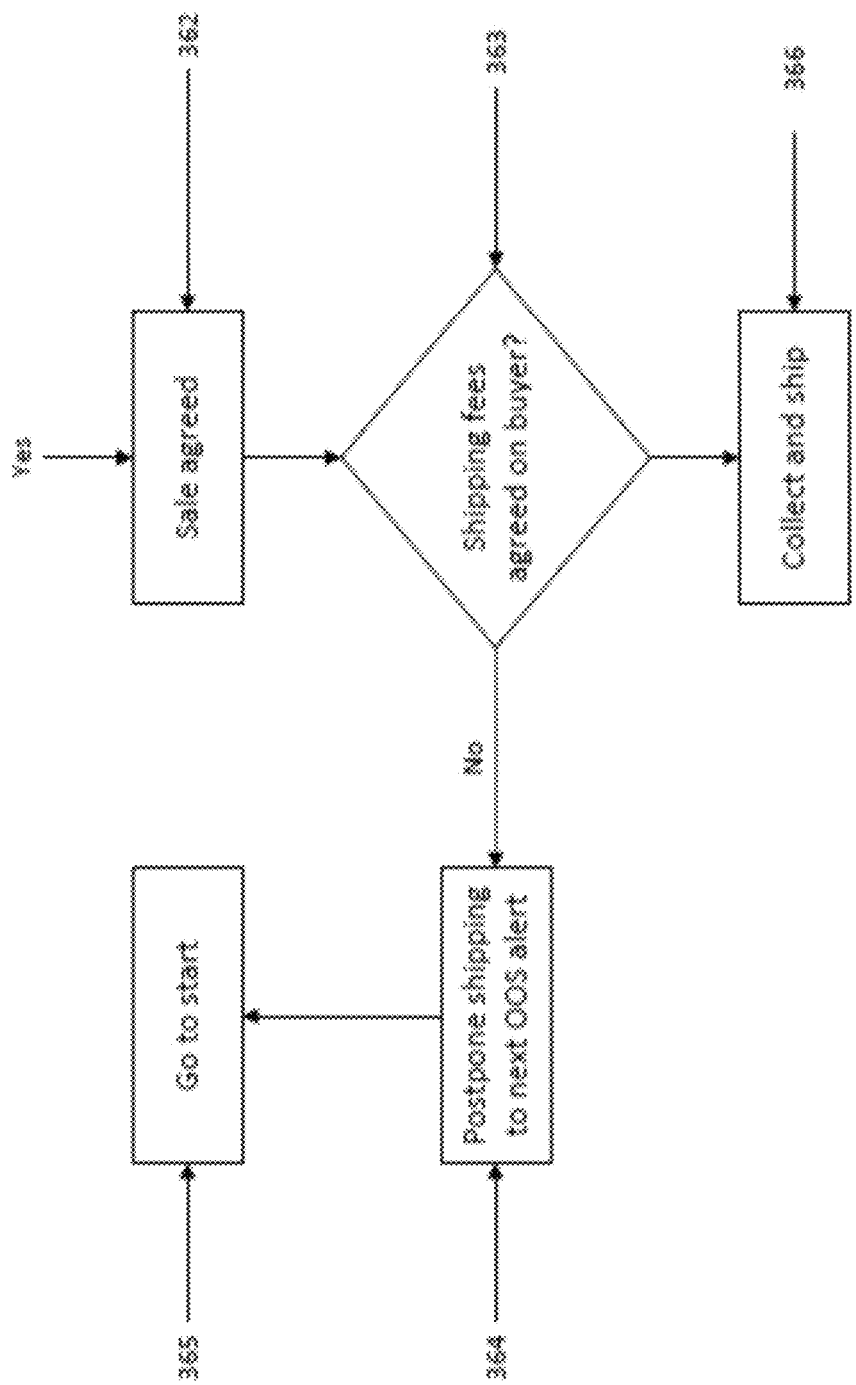

Additional applications of a stock monitoring system 10 include:
1. Navigation system for client/employees—uses: find a product, find a seller, pick to light,
2. Reference is now made to FIG. 21, showing a method for buying on-line 300A. Surfing to an online shopping site 300 and choosing an item 301 are standard steps of buying products. But the customer doesn't know if the product is in stock, or if he/she could choose a substitute. Stock monitor system can check availability of a selected product 302, using a connection between the e/m-commerce site to the stock monitor system's cloud server to verify availability of the chosen product. Then customer is alerted in real time if there is a need to choose a substitute 303, providing the substitute's details 304 and choosing of a substitute product 305 followed by payment 306.
3. Reference is now made to FIG. 22. Another implementation to this on line ordering system starts with the steps of surfing to an online shopping website 310, choosing an item 311, and proceeding to checkout 312. Before checkout, the customer has an option for checking availability 313. If selected products are in stock then a payment page is displayed 317, but if there is/are missing items customer is notified of unavailability 314. The customer is presented with substitutes 315, and choose substitutes 316. The customer may be asked confirm that unavailable products with no substitute will not be delivered. Then customer reach payment page 317. The main difference between the methods 300A and 310A is that the prediction of out of stock and tasks prioritization using data history of product taken from the shelf.
4. Reference is now made to FIG. 23A-23C, showing a method to manage the movement of products between stores. Movement may within the same chain or between different chains; for example, two stores located in the same geographical area. The method uses a bidding system. The main idea of this use is that the Wiseshelf basically establishes a virtual distributed stock DB That helps Retailers to order products to their store even if there is no predefined supply in the supply chain schedule.

Stock monitoring system 10 begins by measuring inventory 350 and reporting the shelves' inventory status 351. A cloud server, which gets the data from the stock monitoring system, categorizes it as out-of-stock or over-stocked 352. The server generates alerts to the user 353, for example an employee, on products that are nearly out of stock or over-stocked and makes recommendations for products to have in over stock. When choosing products from the near out-of-stock list, an exchange server will look for another store with over stock (the seller) 354. If there is no potential seller then the nearly out-of-stock item goes to a list "advised to order" for the next scheduled order 355.

If there is a potential seller, the exchange system sends it an alert to the potential seller 356. The potential seller (the retailer with over stock) needs to approve he wants to sell 357. If the seller doesn't want to sell, the system sends the item to the "advised to order" list, object 358. If the seller agrees to sell the item he needs to suggest a price or agree to a certain discount from the manufacturer 359. The price offer is sent to the buyer (the retailer with item in near out of stock) to decide whether or not to agree to the offered price 360. If the buyer is not willing to pay the amount requested he could suggest a new price 361. If the buyer agrees to pay, sale is agreed, object 362. After sale is agreed, the buyer needs to agree to the delivery fee 363. If the delivery fee is too expensive for amount of products, the buyer can refuse to pay delivery therefore the exchange system hold the delivery 364, wait for another product to join the order, and go to start 365, which means go to step 350. If delivery cost is agreed the exchange system will produce an order to the seller, payment is collected and the items ship 366.
5. Shelf can send information to the client if identified a pick in real time. Such information could be, complimentary products, gift for next visit and more.

6. Cross selling—identify the location where the product was picked if the same product is located in several areas in the store.
7. Testers—Identify the number of times a product is picked until it is bought, connect it to pricing and identify the influence of pricing change. Efficient maintenance of the testers (the testers are changed after number of uses).
8. Identify the impact of facing on sales.
9. Identify the time of the day to send the stock to the store, when the employees are not too busy in other tasks or when stock is about to be finished.

Reference is now made to FIG. 24, illustrating a sample sensor array reading, for the purpose of explaining detection and training algorithms in the shelf logic unit 515.

1. Shelf state detection:
    In very high level, the sensor state algorithm is based on a 3 layered Neural Network model trained using backpropagation on a manually tagged training dataset. Basically the model decides whether a sensor is covered based on inputs from the sensor itself and its immediate surrounding. i.e.—in FIG. 24 the state of the sensors in the middle line (light-shaded) are decided according to the values from the sensors surrounding (light and dark shaded).
    In order to normalize the values an "empty state" calibration is performed upon deployment where the maximum level per sensor in a present lighting environment is determined—this value can then later be automatically adjusted along the lifetime of the shelf.
    The Neural Network can be trained using a tagged training data set containing roughly 10,000 samples collected from about 50 shelves deployed in different pilot & test environments. The data contains samples from about 200 different products. The richness of the dataset as well as the complex model which the Neural Network can support allows us to work with semi-transparent as well as opaque products without the need for a different model or any specific product configuration.
2. product smoothing & error correction:
    the problem we aim to resolve in this phase is that since the products are of different sizes and aren't distributed evenly it is a typical scenario that a product will cover 2 or more sensors while the adjacent product will cover only 1 (or one less . . . ), in addition many products have a bottom which is smaller than the top of the product—thus 2 adjacent products can have gaps between them leaving sensors uncovered. The algorithm passes on the shelf rows and examines gaps between covered areas. The output is the calculation of missing products and area coverage which is later averaged between the rows to achieve the total product area coverage.
3. Store Active hours auto-detection:
    Since the shelf logic is based on light levels, when the store is in-active, typically the lights will be turned off or significantly dimmed down, in such a case the readings from the shelves can falsely be identified as fuller than their real state. The purpose of this algorithm is to recognize the event where the lights have been turned/dimmed on/off. The sensors are sampled on a known interval, hence this event can be described as a significant and consistent change in one direction between two consecutive discrete samples across all shelf sensors. The algorithm needs to take into consideration that the change aren't linear and that in cases where the light levels prior to the change where very low (such in the case of full coverage by an opaque object)—the change can be minor or none. The algorithm continues to follow changes for a short period post the event to eliminate false detection of momentarily events.
4. Shelf Replenish event detection: a shelf replenishment is an event where an employee is filling up the shelf with new products and ordering them. This event differentiates from any other normal shelf activity by its length in time and by the intention of significantly increasing a specific products availability and order from the starting point.
    The algorithm observes any shelf product area for a window of time to detect significant positive measurable changes in availability and order, enabling to detect and differentiate from other shelf activity and measure the time it took to perform the action.
5. Future: Non-opaque product misplacement detection: using clustering techniques, the shelf can learn the typical light signature of a specific non-opaque product states, later these can be used in some extent for the detection of a misplaced items that behaves differently from the learned signature.
6. Future: Sensor malfunction auto detection: by analyzing the deviation in light levels for a specific shelf area for a period of time, the algorithm can detect light sensor that are malfunctioning/misbehaving and enabling tagging them as malfunctioned for the purpose of auto correcting the detection, increasing shelf accuracy and allowing proactive maintenance.

It is understood that specific implementations of a functional unit and that model numbers depicted in the Description and/or Drawings are only representative examples and do not limit the invention to any of those implementations and model numbers.

The invention claimed is:

1. A stock monitoring system comprising
    a plate shaped shelf monitor configured for mounting in a proximity to a shelf, said mounting to the shelf or a support thereof;
    an array of light level sensors disposed along a surface of said shelf monitor and said sensors positioned for facing a stocking region of a stocking shelf while said shelf monitor is in said proximity to the shelf; and
    a CPU module comprising a processor and a non-transitory computer readable medium; said CPU module configured to receive outputs of sensors in said array of light sensors; wherein said CPU module is further configured to
        execute a detection algorithm to detect a status change event of stock on said stocking shelf based on said outputs of said sensors in said array; and
        execute a training algorithm to calibrate parameters of said detection algorithm said training algorithm employing a training set of multiple samples of multiple products in different environments.

2. The stock monitoring system of claim 1, wherein said training algorithm includes an empty-state calibration.

3. The stock monitoring system according to claim 2, wherein a maximum sensor output is initially determined.

4. The stock monitoring system according to claim 3, wherein said maximum sensor output is periodically adjusted.

5. The stock monitoring system of claim 1, wherein said stock includes semi-transparent and opaque products.

6. The stock monitoring system of claim 1, wherein said detection algorithm scans a rows of said sensors, for each row finds gaps between items, and averages adjacent gaps in adjacent rows to determine total product area coverage.

7. The stock monitoring system according to claim 1, wherein said detection algorithm recognizes a dimming of lighting over said stocking.

8. The stock monitoring system of claim 7, wherein said detection algorithm recognizes said dimming from a consistent change in readings of said light level sensors over multiple shelves.

9. The stock monitoring system of claim 8, wherein said consistent change is greater in areas of higher lighting than areas of lower lighting.

10. The stock monitoring system of claim 8, wherein said detection algorithm recognizes said dimming from a consistent change in readings of said light level sensors over time.

11. The stock monitoring system according to claim 1, wherein said status change event is a shelf replenishment event; said shelf replenishment event is detected by said detection algorithm by an event duration of said status change event and by an intention of significantly increasing a specific item's inventory.

12. The stock monitoring system according to claim 1, further comprising:
   an electronics unit comprising the following modules:
      said CPU module;
      a power module supplying power to other modules in said electronics unit; and
      a communication module configured for communication by said CPU of said
      electronics module and one or more of
      a said CPU module of another of said electronics module;
      a computing device; and
      a server.

13. The stock monitoring system according to claim 12, wherein said shelf monitor is constructed of three layers:
   a first layer comprising said array of sensors;
   a second layer comprising said electronics unit; and
   a third layer enclosing and supporting said electronics unit.

14. The stock monitoring system according to claim 13, wherein said electronics unit further comprises a series of LEDs disposed on said shelf monitor.

15. The stock monitoring system according to claim 14, wherein said LEDs are configured to perform functions selected from a group comprising: to help locate the shelf, as a product promotion, as a planogram verification, to verify connectivity and health status of modules in the electronics unit, to streamline QA processes, to send messages to communicate with humans, and to communicate with cameras.

16. The stock monitoring system according to claim 13, wherein said electronics unit further comprises a next-shelf monitor connector, providing connectivity between said communication module and a communication module of a second shelf monitor monitoring another stocking shelf.

17. The stock monitoring system according to claim 13, comprising a plurality of said shelf monitors, wherein one of said shelf monitors is a master shelf monitor and the other shelf monitors are slave shelf monitors; said CPU module of said master shelf monitor further comprising a main processor, wherein said main processor is configured to perform tasks selected from a group consisting of:
   aggregate data from said plurality of shelf monitors;
   communicate said aggregated data to a central server; and
   provide a gateway for network connectivity to CPU modules of slave shelf monitors.

18. The stock monitoring system according to claim 17, wherein said CPU module of said master shelf monitor further comprises \
   a web server;
   a user interface module;
   a messaging module, configured to receive commands from said central server;
   a scheduler, configured to set predefined tasks or set modes;
   an API module, to communicate with slave shelves;
   a shelf logic module, configured to create rules and patterns for employment in said detection and training algorithms; and
   a shelf serial protocol.

19. The stock monitoring system according to claim 17, further comprising a remote cloud server.

20. The system of claim 12, wherein said communication module includes a wireless standard wireless transceiver and protocol configured for communication device of a customer.

21. The system according to claim 20, wherein said transceiver is configured for at least one of a Near-Field Communication (NFC) standard, ZigBee standard, Bluetooth standard, and WiFi standard.

22. The system of claim 12, wherein said communication module includes a wireless standard wireless transceiver and protocol configured for communication with at least one of a server, a smartphone, a Personal Computer (PC), a Smart Television (TV), a Point-Of-Sale (POS), a wearable device, a digital signage device, and a tablet.

23. The system according to claim 12, wherein the communication module is configured to communicate using, a standard protocol that provides secured, bi-directional, communication between Internet-connected devices.

24. The system according to claim 23, wherein the standard protocol is based on, according to, or using, a Hypertext Transfer Protocol (HTTP) or a Hypertext Transfer Protocol Secure (HTTPS) protocol.

25. The system of claim 12, wherein the communication module is configured to communicate using a Message Queuing Telemetry Transport (MQTT) protocol, and wherein the communication module of said shelf monitor is serving as an MQTT client and another shelf monitor as an MQTT server or broker.

26. The system according to claim 25, wherein the MQTT protocol is based on, or using, an open source MQTT software, and wherein the MQTT software is based on, comprises, or is according to, Eclipse Mosquitto™ or Amazon Web Services (AWS) Internet-of-Thongs (IoT).

27. The system according to claim 12, wherein the communication module includes a client software for communication with a user device based on, a server client architecture.

28. The system according to claim 12, wherein the communication module is addressable in a network using a digital address.

29. The system according to claim 1, wherein each of the sensors comprises a photosensor or photoresistor.

30. The system according to claim 29, wherein the photoresistor includes a Cadmium sulfide (CdS) light meter.

31. The system according to claim 1, wherein said proximity to a shelf is over said stocking region.

32. The system of claim 1, wherein said light level sensors sense light from ordinary illumination of said shelf.

33. The system according to claim 32, wherein said light level sensors include a Cadmium sulfide (CdS) light meter.

34. The system of claim 1, wherein said CPU is configured to identify a misplaced item in said stocking region.

\* \* \* \* \*